United States Patent
Daniyalzade et al.

(10) Patent No.: US 11,115,780 B2
(45) Date of Patent: Sep. 7, 2021

(54) SYSTEM AND METHOD FOR OPTIMIZED NAVIGATION

(71) Applicant: Walmart Apollo, LLC, Bentonville, AR (US)

(72) Inventors: Eytan Daniyalzade, San Francisco, CA (US); Berk Atikoglu, San Francisco, CA (US); David Nelms, Rogers, AR (US)

(73) Assignee: WALMART APOLLO LLC, Bentonville, AR (US)

( * ) Notice: Subject to any disclaimer, the term of this patent is extended or adjusted under 35 U.S.C. 154(b) by 159 days.

(21) Appl. No.: 16/261,089

(22) Filed: Jan. 29, 2019

(65) Prior Publication Data

US 2019/0239026 A1   Aug. 1, 2019

Related U.S. Application Data

(60) Provisional application No. 62/623,464, filed on Jan. 29, 2018, provisional application No. 62/623,474, filed on Jan. 29, 2018.

(51) Int. Cl.
*H04W 4/024* (2018.01)
*H04W 4/021* (2018.01)
(Continued)

(52) U.S. Cl.
CPC .......... *H04W 4/024* (2018.02); *G01C 21/343* (2013.01); *G06F 16/24575* (2019.01);
(Continued)

(58) Field of Classification Search
CPC ........ G01S 5/00; G01S 5/0009; G01S 5/0018; G01S 5/0027; G01S 5/0045;
(Continued)

(56) References Cited

U.S. PATENT DOCUMENTS 6,522,772 B1   2/2003  Morrison et al.
8,219,503 B2 *  7/2012  Takahashi ............ G06Q 10/087
                                                        705/330
(Continued)

*Primary Examiner* — Anthony R Jimenez
(74) *Attorney, Agent, or Firm* — Bryan Cave Leighton Paisner LLP

(57) ABSTRACT

Various embodiments include a system that can comprise one or more processing modules and/or one or more non-transitory memory storage modules storing computing instructions on the one or more processing modules. The computing instructions can be configured to perform the acts of receiving an ordered list from a user via a software application on a mobile device of the user, wherein the software can comprise a bar code scanner, wherein the ordered list can comprise a first set of records describing a first set of physical items; receiving first data obtained from the barcode scanner, wherein the first data can comprise a first distinct record describing a first distinct physical item within the first set of physical items; querying a physical item database, wherein the physical item database can comprise a second distinct record describing the location of the first distinct physical item and a second set of records describing locations of the first set of physical items; calculating a first optimized route from the location of the first distinct physical item to a first series of distinct physical items using at least a portion of the second set of records and the second distinct record, wherein the first series of distinct physical items can comprise at least a portion of the first set of physical items; creating a first reordered list from the first series of distinct physical items using the first optimized route; and presenting the first optimized route and the first reordered list to the user via a graphic user interface on the software application on the mobile device of the user. Other embodiments are also disclosed herein.

20 Claims, 10 Drawing Sheets

(51) Int. Cl.

| | |
|---|---|
| *G01C 21/34* | (2006.01) |
| *G06Q 30/06* | (2012.01) |
| *G06Q 10/04* | (2012.01) |
| *H04W 4/33* | (2018.01) |
| *G06F 16/2457* | (2019.01) |
| *G06F 16/29* | (2019.01) |
| *G06K 7/10* | (2006.01) |
| *G06K 7/14* | (2006.01) |
| *G06K 19/07* | (2006.01) |
| *G08B 21/24* | (2006.01) |

(52) U.S. Cl.
CPC ......... *G06F 16/29* (2019.01); *G06K 7/10297* (2013.01); *G06K 7/10366* (2013.01); *G06K 7/1413* (2013.01); *G06K 19/0723* (2013.01); *G06Q 10/047* (2013.01); *G06Q 30/0639* (2013.01); *G08B 21/24* (2013.01); *H04W 4/021* (2013.01); *H04W 4/33* (2018.02)

(58) Field of Classification Search
CPC ........ G01S 5/0054; G01S 5/013; G01S 5/016; G01S 5/017; G08G 9/00; G08B 21/24; G06Q 30/00; G06Q 30/06; G06Q 30/0639; G06Q 30/0222; G06Q 30/0238; G06Q 30/0641; G06Q 30/0643; G06Q 10/00; G06Q 10/04; G06Q 10/047; G06Q 10/06; G06Q 10/06311; G06Q 10/08; G06Q 10/08355; G06K 19/00; G06K 19/07; G06K 19/0723; G06K 7/00; G06K 7/10297; G06K 7/10366; G06K 7/10376; G06K 7/1404; G06K 7/1417; G06K 7/1413; G01C 21/343; G06F 17/30864; G06F 16/00; G06F 16/10; G06F 16/245; G06F 16/24575; G06F 16/29; H04W 4/00; H04W 4/02; H04W 4/022; H04W 4/025; H04W 4/021; H04W 4/024; H04W 4/33; H04W 4/30; H04W 4/35; H04W 4/38; H04W 4/029; H04W 4/12; H04W 4/14
USPC ....................................................... 340/686.6
See application file for complete search history.

(56) References Cited

U.S. PATENT DOCUMENTS

| | | | |
|---|---|---|---|
| 8,880,434 | B2 | 11/2014 | Bemmel et al. |
| 9,665,896 | B2 | 5/2017 | Atikoglu et al. |
| 2003/0018522 | A1 | 1/2003 | Denimarck et al. |
| 2004/0133477 | A1 | 7/2004 | Morris et al. |
| 2007/0129056 | A1 | 6/2007 | Cheng et al. |
| 2008/0046366 | A1 | 2/2008 | Bemmel et al. |
| 2009/0012704 | A1* | 1/2009 | Franco ............ G01C 21/20 701/532 |
| 2009/0152343 | A1 | 6/2009 | Carter et al. |
| 2012/0259732 | A1 | 10/2012 | Sasankan et al. |
| 2013/0112746 | A1 | 5/2013 | Krell |
| 2014/0244514 | A1 | 8/2014 | Rodriguez et al. |
| 2017/0270559 | A1 | 9/2017 | Zimmerman et al. |

\* cited by examiner

SYSTEM AND METHOD FOR OPTIMIZED NAVIGATION

CROSS REFERENCE TO RELATED APPLICATIONS

This application claims the benefit of Provisional Patent Application No. 62/623,464, filed Jan. 29, 2018, which is herein incorporated by reference in its entirety. This application also claims the benefit of Provisional Patent Application No. 62/623,474, filed Jan. 29, 2018, which is herein incorporated by reference in its entirety.

TECHNICAL FIELD

This disclosure generally relates to navigation technologies, and more particularly to computer controlled waypoint navigation.

BACKGROUND

Modern navigation systems present many disadvantages. All are expensive to create, maintain, and operate. Further, less expensive options, such as accessing global positioning systems (GPS) provided by the government, require a clear line of sight with multiple satellites. Thus, these systems do not work well indoors, in cities with large buildings, or under any other cover where the sky cannot be seen.

BRIEF DESCRIPTION OF THE DRAWINGS

To facilitate further description of the embodiments, the following drawings are provided in which.

Figure 1:
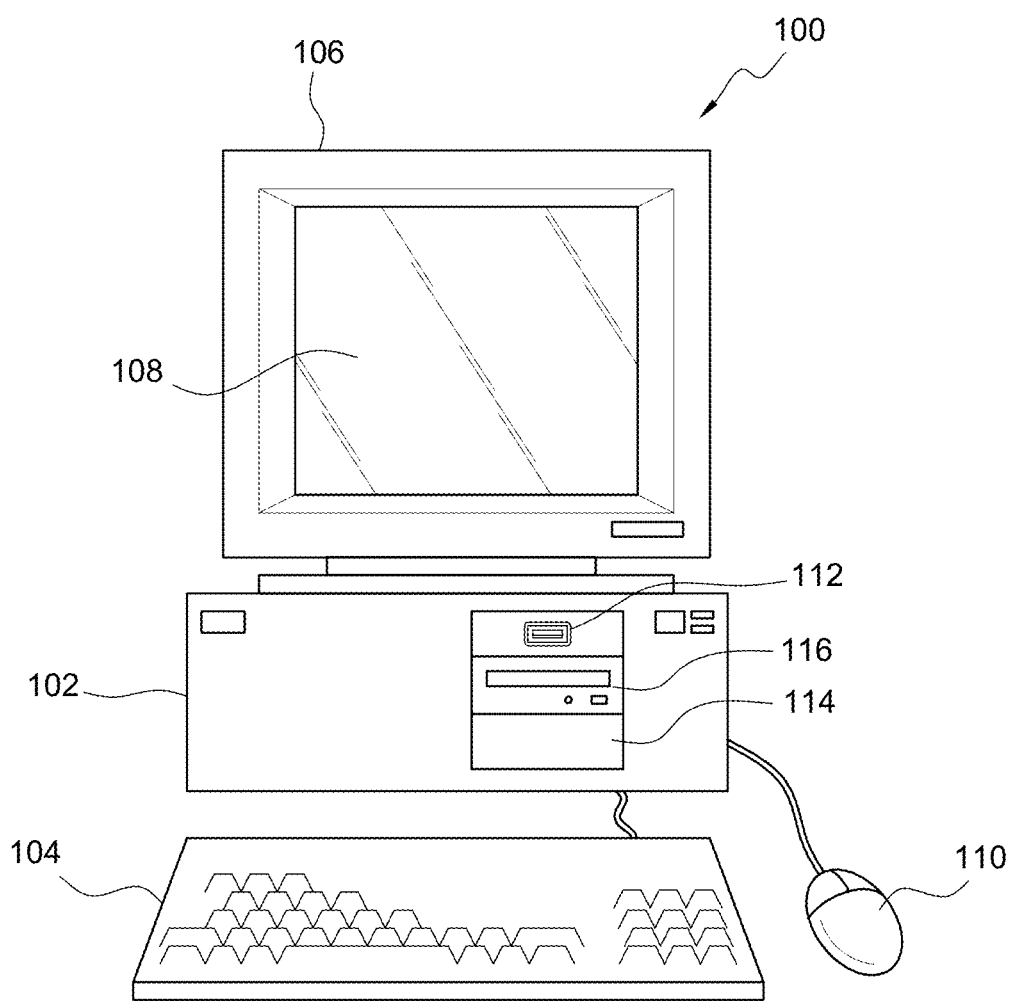
FIG. 1 illustrates a front elevation view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments can include a system that can comprise one or more processing modules and/or one or more non-transitory memory storage modules storing computing instructions on the one or more processing modules. The computing instructions can be configured to perform the acts of receiving an ordered list from a user via a software application on a mobile device of the user, wherein the software can comprise a bar code scanner, wherein the ordered list can comprise a first set of records describing a first set of physical items; receiving first data obtained from the barcode scanner, wherein the first data can comprise a first distinct record describing a first distinct physical item within the first set of physical items; querying a physical item database, wherein the physical item database can comprise a second distinct record describing the location of the first distinct physical item and a second set of records describing locations of the first set of physical items; calculating a first optimized route from the location of the first distinct physical item to a first series of distinct physical items using at least a portion of the second set of records and the second distinct record, wherein the first series of distinct physical items can comprise at least a portion of the first set of physical items; creating a first reordered list from the first series of distinct physical items using the first optimized route; and presenting the first optimized route and the first reordered list to the user via a graphic user interface on the software application on the mobile device of the user.

Other embodiments can include a method that can comprise receiving an ordered list from a user via a software application on a mobile device of the user, wherein the software can comprise a bar code scanner, wherein the ordered list can comprise a first set of records describing a first set of physical items; receiving first data obtained from the barcode scanner, wherein the first data can comprise a first distinct record describing a first distinct physical item within the first set of physical items; querying a physical item database, wherein the physical item database can comprise a second distinct record describing the location of the first distinct physical item and a second set of records describing locations of the first set of physical items; calculating a first optimized route from the location of the first distinct physical item to a first series of distinct physical items using at least a portion of the second set of records and the second distinct record, wherein the first series of distinct physical items can comprise at least a portion of the first set of physical items; creating a first reordered list from the first series of distinct physical items using the first optimized route; and presenting the first optimized route and the first reordered list to the user via a graphic user interface on the software application on the mobile device of the user.

The most common modern navigation systems in use today are global positioning systems (GPS). These systems present many drawbacks, though. First, GPS does not work well in situations where the receiver (e.g., a mobile device or smartphone) does not have a clear line of sight to the sky. This problem can occur often today, as many users attempt to use GPS navigation indoors, in cities with tall buildings that obstruct the sky, or during weather events with thick cloud cover. Further, GPS navigation requires the use of satellites owned and maintained by the government, and at least some users fear government surveillance will occur if they use GPS navigation.

In response to the poor operation of GPS navigation in situations where the sky is obstructed, many individuals have proposed using Bluetooth beacons, Near Field Communication (NFC) beacons, WiFi, or radio frequency identification (RFID) systems. While these systems have proven to be successful, they are prohibitively expensive to set up and maintain. Further, many users still fear that activating the related transceivers can result in unwanted surveillance by either the government or corporations.

One solution to this technical problem can include creating a system and/or method that leverages a detailed layout of an area or a building and the items inside of the area or building to create optimized routes for a user to travel. This solution avoids the technical problems of poor GPS locations and routing when the sky is obscured because it leverages the known locations of items to locate the user instead of real time GPS tracking. The large expense of creating other navigation systems also is avoided as a system and/or method such as the one described herein is based on leveraging detailed location data instead of purchasing new equipment. Further, this system and/or method avoids the specter of location-based surveillance because the user's exact location is not continually transmitted to a third party.

As evidenced by this disclosure, the principles described herein are rooted in computer technologies that overcome existing problems in navigation systems relating to accuracy and cost. Specifically, embodiments of this invention solve technical problems associated with the poor accuracy of GPS systems when the sky is obstructed, and the expense of establishing more accurate navigation systems other than GPS. Known navigation systems cannot navigate accurately without a clear connection to GPS satellites, and installation of navigation systems that can navigate accurately without a connection to GPS satellites can be cost prohibitive. The principles described in this disclosure provide a technical solution (e.g., one that implements navigation technologies in novel ways) for overcoming such problems. This technology-based solution marks an improvement over existing computing capabilities and functionalities related to navigation systems by improving accuracy, decreasing costs, increasing privacy, and increasing security. The novel systems are designed to improve the way navigation systems create routes and locate the user.

Further, this disclosure also contains descriptions of graphical user interfaces ("GUIs"). The GUIs discloses can facilitate a smoother, more integrated, and easier user experience for navigation without GPS satellites or a connection to a mobile network. These disclosed GUIs mark improvements over existing navigation GUIs by making creation, optimization, and customization of routes easier when GPS satellites are not available. In addition, the techniques described herein can solve a technical problem that arises only within the realm of computer networks, as problems with navigating on a mobile device without GPS satellites do not exist outside the realm of computer networks. Moreover, the techniques described herein can solve a technical problem that cannot be solved outside the context of computer networks. Specifically, the techniques described herein cannot be used outside the context of computer networks because navigation on a mobile device cannot be performed without a computer.

Figure 2:
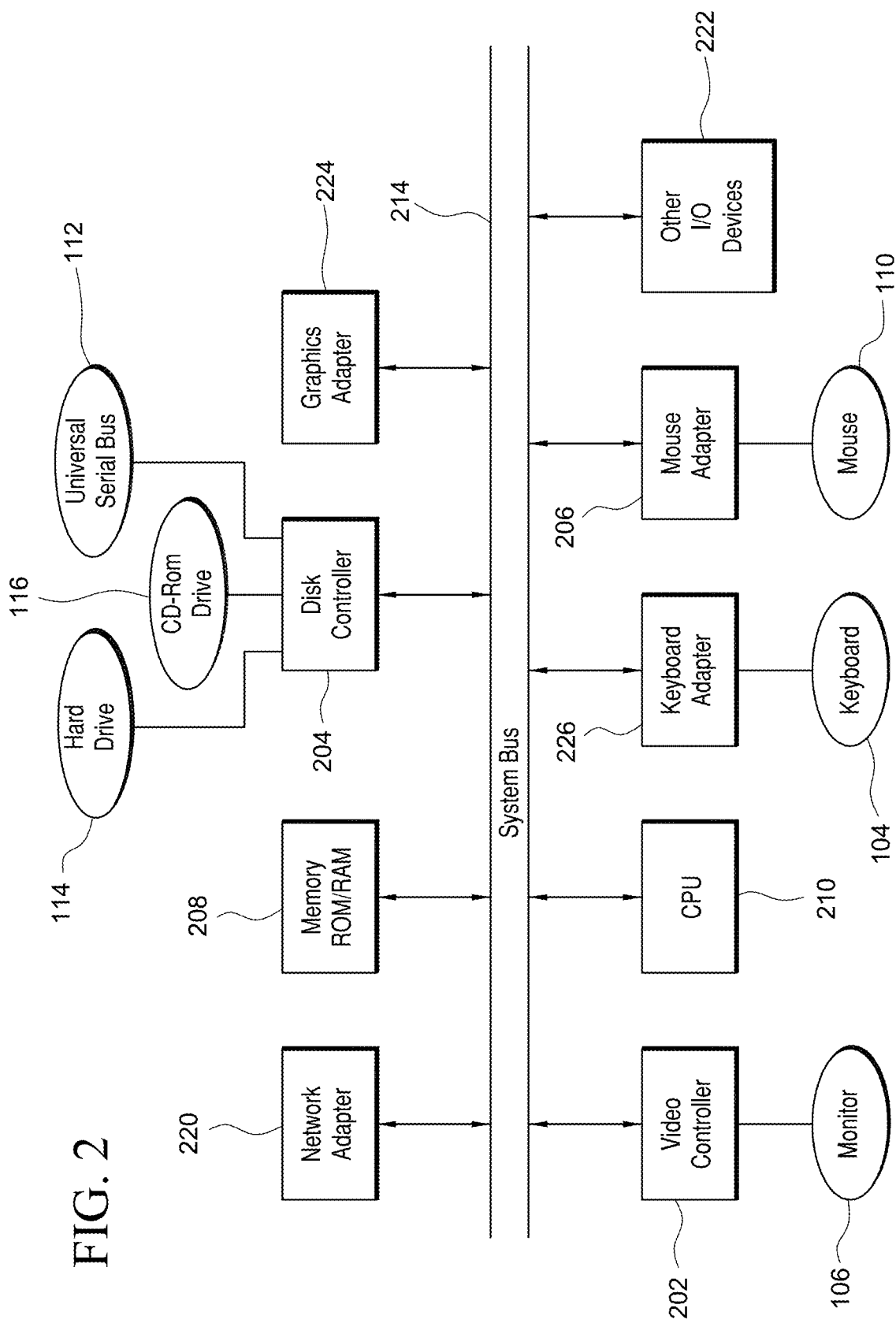
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) can also be appropriate for implementing the techniques described herein. Computer system 100 comprises chassis 102 containing one or more circuit boards (not shown), a Universal Serial Bus (USB) port 112, a Compact Disc Read-Only Memory (CD-ROM), Digital Video Disc (DVD) drive, or Blu-Ray drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS) or Unified Extensible Firmware Interface (UEFI). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM, DVD drive, or Blu-Ray drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise various versions/distributions of Microsoft® Windows® operating system (OS), Apple® OS X, UNIX® OS, and Linux® OS.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 can take a different form factor while still having functional elements similar to those described for computer system 100. In some embodiments, computer system 100 can comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 can comprise a portable computer, such as a laptop computer. In certain other embodiments, computer system 100 can comprise a mobile device, such as a smart phone or a tablet. In certain additional embodiments, computer system 100 can comprise an embedded system. It should also be understood that a particular configuration of computer system 100 may or may not contain each of the items shown in FIG. 1 or 2 or may in fact contain multiple of each of the items shown in FIG. 1 or 2. For example, certain implementations of computer system 100 may not contain a CD-ROM, DVD, or Blu-Ray drive 116. Other implementations of computer system 100 may contain two CD-ROM, DVD, or Blu-Ray drives 116. Other implementations of computer system 100 can contain 2 or more monitors 106. Other implementations of computer system 100 could contain no monitors. Other implementations of computer system 100 can contain equivalents to certain items. For example, hard drive 114 can be replaced or augmented by a solid-state drive (SSD).

Figure 3:
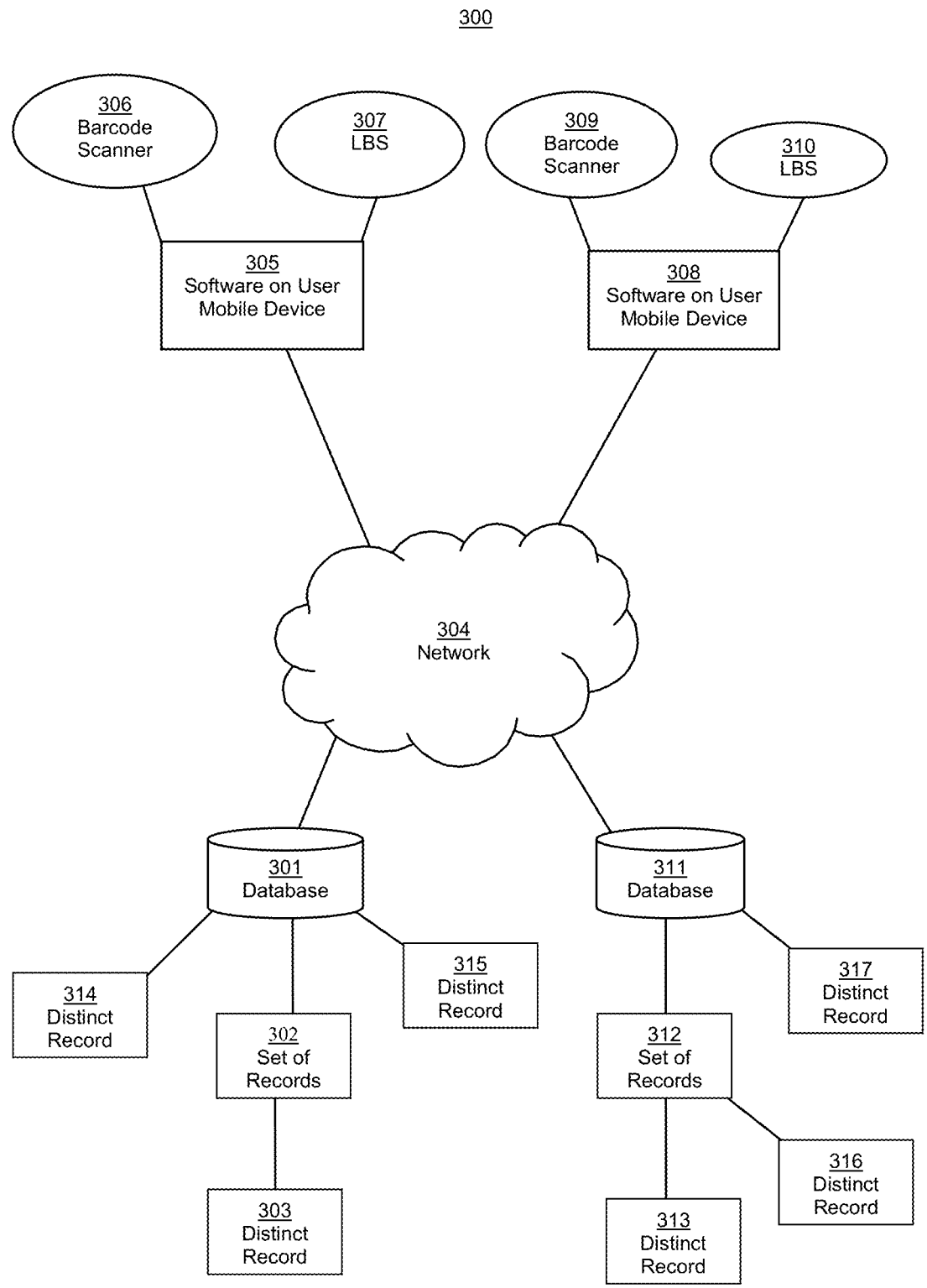
FIG. 3 illustrates a block diagram of an exemplary navigation system.

Turning ahead in the drawings, FIG. 3 illustrates a block diagram of an exemplary embodiment of the disclosed system 300 that can be employed for navigation as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, databases 301, 311 can each comprise sets of records 302, 312, respectively, which in turn can comprise a distinct record 303 (for set of records 302) or more than one distinct record 313, 316, 317 (for set of records 312). In some embodiments, databases 301, 311 can comprise a distinct record 317 (for database 311) or more than one distinct record 314, 315 (for database 301). In some embodiments, databases 301, 311 can be accessed or queried through network 304.

Network 304 can be implemented using any suitable manner of wired and/or wireless communication, and can include the Internet and/or an intranet. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Databases 301, 311 can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Further, in some embodiments, network 304 can allow software 305, 308 to access or query databases 301, 311. In some embodiments, software 305, 308 can each comprise barcode scanner modules 306, 309, respectively, or location based services (LBS) modules 307, 310, respectively. In some embodiments, LBS 307, 310 can comprise any type of location based service module such as, for example, global positioning (GPS), Wi-Fi positioning (WiFi), a radio frequency identification (RFID), near field communication (NFC), Bluetooth beacons, ultra-wide band (UWB) technology, infrared (IR) beacons, or other such location based systems known heretofore or invented. In some embodiments, databases 301, 311 can be simultaneously or at separate times accessed or queried by more than one software 305, 308.

Software 305, 308 can be located on user mobile electronic devices. Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

Figure 4:
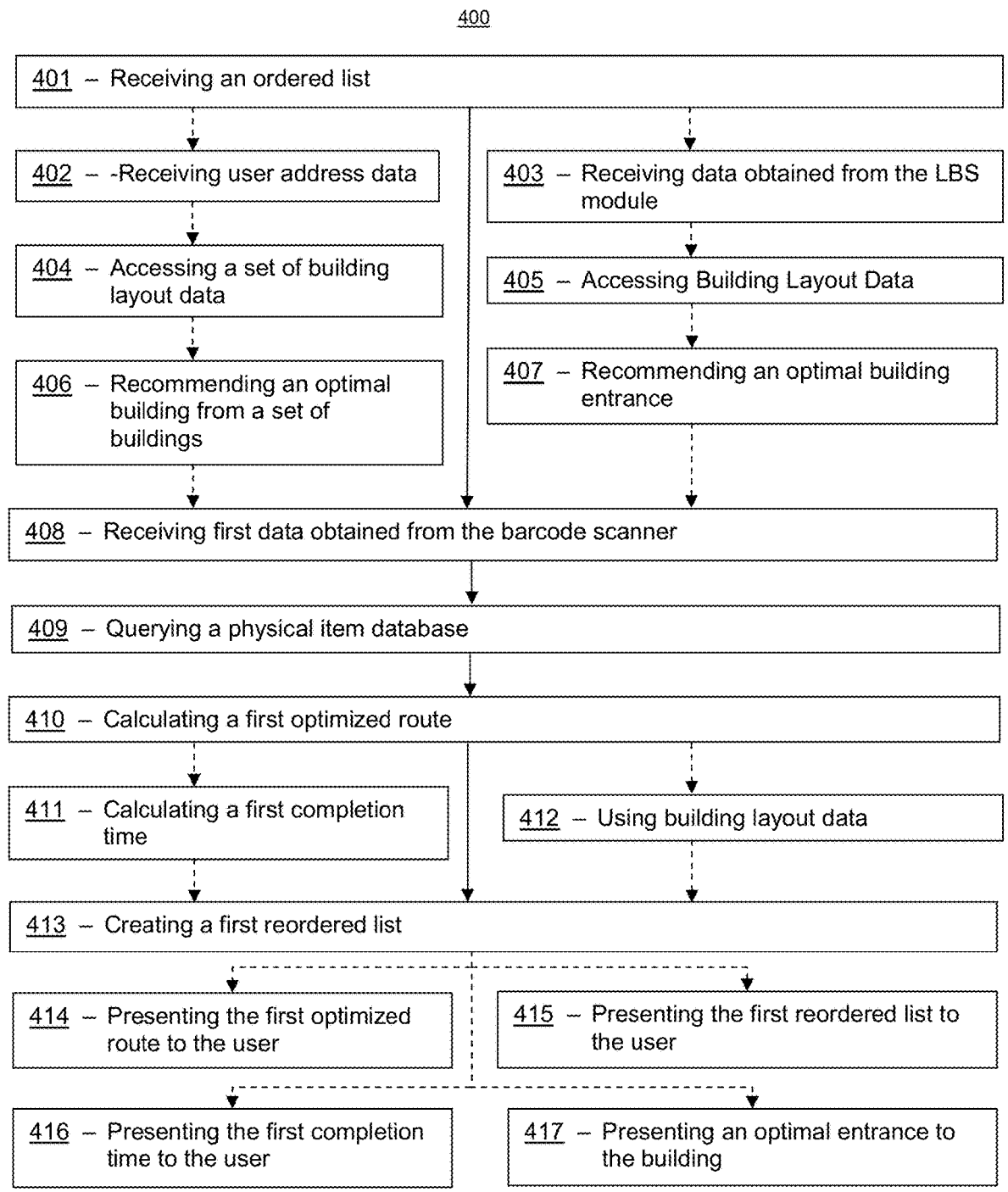
FIG. 4 illustrates a flowchart for an exemplary method.

Turning now to FIG. 4, a flowchart 400 displaying an exemplary embodiment of a disclosed system or method is shown. Flowchart 400 is merely exemplary and is not limited to the embodiments presented herein. Flowchart 400 can be employed in many different embodiments or examples not specifically depicted or described herein. In some embodiments, activities or blocks of flowchart 400 can be performed in an order presented. In other embodiments, activities of flowchart 400 can be performed in any suitable order. In still other embodiments, one or more activities of flowchart 400 can be combined or skipped. In many embodiments, system 300 (FIG. 3) can be suitable to perform flowchart 400 and/or one or more activities or blocks of flowchart 400. In these or other embodiments, one or more of the activities or blocks of flowchart 400 can be implemented as one or more computer instructions configured to run at one or more processing modules and configured to be stored at one or more non-transitory memory storage modules. Such non-transitory memory storage modules can be part of a computer system, as described above. The processing module(s) can be similar or identical to the processing module(s) described above with respect to computer system 100 (FIG. 1) and computer system 200 (FIG. 2).

In some embodiments, flowchart 400 and other blocks in flowchart 400 can include using a distributed network including distributed memory architecture to perform the associated activity. This distributed architecture can reduce the impact on the network and system resources to reduce congestion in bottlenecks while still allowing data to be accessible from a central location.

Figure 5:
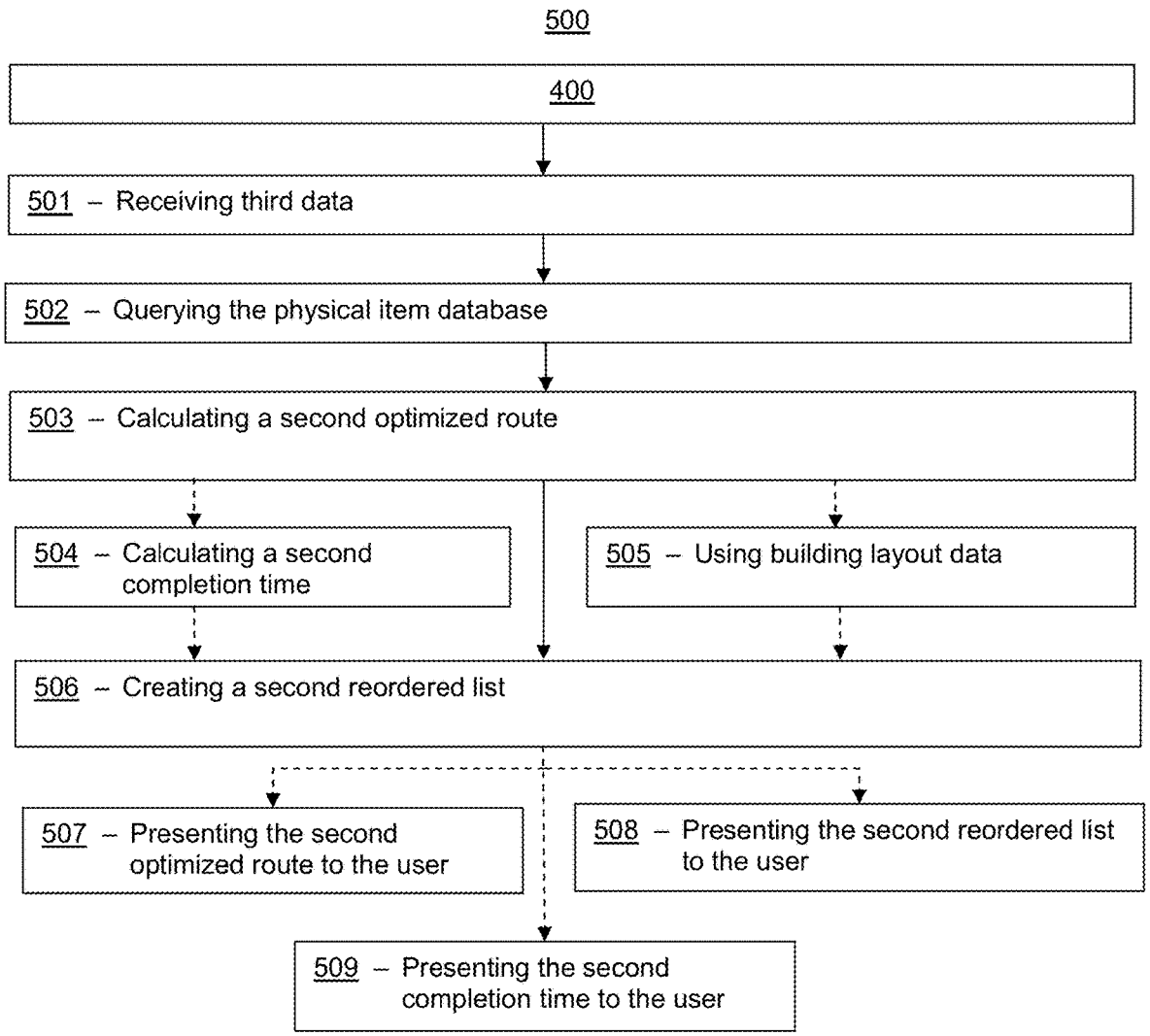
FIG. 5 illustrates a flowchart for an exemplary method.

In some embodiments, a system and/or method can comprise block 401 for receiving an ordered list. In some embodiments, set of records 302, 312 (FIG. 3) or one or more distinct records 303, 313, 314, 315, 316, 317 (FIG. 3) can comprise an ordered list. In some embodiments, an ordered list can be created by a user, created from a user's shopping history, generated based on a taste profile of a user, and/or generated from an unordered list supplied by a user. In embodiments where an ordered list is generated from an unordered list, the ordered list can be ordered based upon an optimized route, as described in block 410 and/or block 503 (FIG. 5). As an example, an ordered list can comprise a customer's shopping list. In some embodiments, a distinct record or a set of records can describe a physical item or a set of physical items. A distinct record or a set of records can describe a physical item or a set of physical items when it contains information about the set of physical items or the distinct physical item. In some embodiments, information about or describing the set of physical items can comprise price information, a physical description, one or more images, one or more serial numbers, one or more make or model numbers, or any other suitable method for describing a set of physical items or a physical item. In some embodiments, a set of physical items can comprise physical incarnations of one or more items described in a record or set of records.

In some embodiments, an ordered list can be entered into and/or displayed on a graphical user interface ("GUI") displayed on a software application on a mobile device of a user. In some embodiments, an ordered list can be displayed on GUI 600 (FIG. 6) and/or GUI 700 (FIG. 7). In many embodiments, a GUI can be used to receive other inputs from a user and/or present other elements of the invention to the user. For example, a GUI can also be implemented in block 402, 406, 407, 414, 415, 416, 471, 501 (FIG. 5), 507 (FIG. 5), 508 (FIG. 5), and/or 509 (FIG. 5). In various embodiments, a software application on a mobile device of a user can comprise software 305, 308 (FIG. 3). In many embodiments, a GUI can be part of and/or displayed by a software application on a mobile device of a user, which also can be part of system 300 (FIG. 3). In some embodiments, a GUI can comprise text and/or graphics (image) based user interfaces. In the same or different embodiments, a GUI can comprise a heads up display ("HUD"). When a GUI comprises a HUD, the GUI can be projected onto glass or plastic, displayed in midair as a hologram, or displayed on monitor 106 (FIG. 1). In various embodiments, a GUI can be color or black and white. In many embodiments, a GUI can comprise an application running on a computer system, such as computer system 100, a user device, and/or a server computer. In the same or different embodiments, a GUI can comprise a website accessed through network 304 (FIG. 3).

In some embodiments, a GUI can comprise an eCommerce website. In the same or different embodiments, a GUI can be displayed as or on a virtual reality (VR) and/or augmented reality (AR) system or display.

In some embodiments, after block 401, a system and/or method can comprise block 402 for receiving user address data. Set of records 302, 312 and/or one or more distinct records 303, 313, 314, 315, 316, 317 (FIG. 3) can comprise user address data. In some embodiments, user address data can describe a location of a building or a set of buildings. User address data can describe a location of a building or a set of buildings when it contains information about the location of the building or the set of buildings. In some embodiments, information about the building or the set of buildings can comprise a physical description, one or more images, one or more street addresses, one or more GPS coordinates, one or more values associated with a geographic coordinate system, and/or one or more computer aided design (CAD) files. In some embodiments, user address data can be received from software 305, 308 (FIG. 3) on a mobile device of a user. In some embodiments, user address data can be obtained from an LBS module, obtained from a barcode scanner, and/or supplied by a user themselves. In some embodiments, user address data can be entered into a GUI displayed on a software application on a mobile device of a user.

In some embodiments, also after block 401, a system and/or method can comprise block 403 for receiving data obtained from an LBS module. Data obtained from an LBS module can comprise a physical description, one or more images, one or more addresses, one or more GPS coordinates, one or more values associated with a geographic coordinate system, one or more computer aided design (CAD) files, location data obtained from Wi-Fi positioning module, location data obtained from a radio frequency identification module, location data obtained from near field communication module, location data obtained from Bluetooth beacons, location data obtained from an ultra-wide band (UWB) module, or location data obtained from infrared (IR) beacons. Set of records 302, 312 (FIG. 3) and/or one or more distinct records 303, 313, 314, 315, 316, 317 (FIG. 3) can comprise such data.

In some embodiments, a system and/or method can comprise block 404 for accessing a set of building layout data. In some embodiments, set of records 302, 312 (FIG. 3) and/or one or more distinct records 303, 313, 314, 315, 316, 317 (FIG. 3) can comprise a set of building layout data. In some embodiments, a distinct record or a set of records can describe a physical layout of each of a set of buildings. A distinct record or a set of records can describe a physical layout of a building or a set of buildings when it contains information about a layout and/or organization of a building or a set of buildings. In some embodiments, information about a layout and/or organization of a building or a set of distinct buildings can comprise a physical description, one or more images, one or more addresses, one or more GPS coordinates, one or more values associated with a geographic coordinate system, one or more computer aided design (CAD) files, one or more aisle numbers, and/or one or more section numbers. In some embodiments, a building or a set of buildings can comprise one or more retail stores, one or more libraries, or one or more warehouses.

In some embodiments, a system and/or method can comprise block 405 for accessing building layout data. In some embodiments, set of records 302, 312 (FIG. 3) and/or one or more distinct records 303, 313, 314, 315, 316, 317 (FIG. 3) can comprise building layout data. In some embodiments, a distinct record or a set of records can describe a physical layout of a building. A distinct record or a set of records can describe a physical layout of a building or a set of buildings when they contain information about a layout and/or organization of a building or a set of buildings. In some embodiments, information about a layout and/or organization of a building or a set of buildings can comprise a physical description, one or more images, one or more addresses, one or more GPS coordinates, one or more values associated with a geographic coordinate system, one or more computer aided design (CAD) files, one or more aisle numbers, and/or one or more section numbers. In some embodiments, a building or a set of buildings can comprise one or more retail stores, one or more libraries, and/or one or more warehouses.

In some embodiments, a system and/or method can comprise calculating an optimal building from a set of distinct buildings. In many embodiments, calculating an optimal building can be accomplished by using any optimization equations, algorithms, and/or heuristics known in the art. Exemplary equations, algorithms, and/or heuristics solve a Travelling Salesman Problem (e.g., given a list of waypoints and distances between each pair of waypoints, what is a shortest possible route that visits each waypoint and returns to an entrance?) and/or a Vehicle Routing Problem (e.g., what is an optimal set of routes for a group of users to traverse in order to arrive at a given set of waypoints?). In the same or different embodiments, calculating an optimal building can comprise determining a building closest to a user. In various embodiments, calculating an optimal building can comprise determining a building most frequently visited by a user based upon historical location data of the user. Accordingly, in some embodiments, the system or method can comprise block 406 for calculating an optimal building from a set of distinct buildings and recommending an optimal building. In some embodiments, an optimal building can comprise a building with a layout that allows a user to most efficiently acquire items on an ordered list, a building with product pricing that allows a user to shop most economically, a building where the user's shopping time is minimized, a building that contains the largest percentage of items on a user's list, a building most frequently visited by a by a user, a building last visited by a user, a building closest to a user, and/or a building selected by a user.

In some embodiments, an optimal building can be presented to a user on a GUI on a software application on a mobile device of a user. In other embodiments, a list of optimal buildings can be presented to a user on a GUI on a software application on a mobile device of a user, and the user can choose a building from a set of buildings from which to display the optimized route.

In some embodiments, the system and/or method can comprise calculating an optimal building entrance from a set of entrances. In many embodiments, calculating an optimal building entrance can be accomplished by using any optimization equations, algorithms, and/or heuristics known in the art. Exemplary equations, algorithms, and/or heuristics solve the Travelling Salesman Problem (e.g., given a list of waypoints and distances between each pair of waypoints, what is a shortest possible route that visits each waypoint and returns to an entrance?) and/or the Vehicle Routing Problem (e.g., what is an optimal set of routes for a group of users to traverse in order to arrive at a given set of waypoints?). In the same or different embodiments, calculating an optimal building entrance can comprise determining a building entrance closest to a user. In various embodiments, calculating an optimal building entrance can comprise determining a building entrance most frequently visited by a user based upon historical location data of the user. Accordingly, in some embodiments, a system or method can comprise block 407 for calculating an optimal building entrance and recommending an optimal building entrance. In some embodiments, an optimal building entrance can comprise a building entrance that allows a user to most efficiently acquire items on an ordered list, a building entrance through which the user's shopping time is minimized, a building entrance that allows a user to access items on a user's list fastest, a building entrance most frequently visited by a by a user, a building entrance last visited by a user, a building entrance closest to a user, and/or a building entrance selected by a user. In the same or different embodiments, a recommended optimal building entrance can be displayed on a GUI displayed on a software application on a mobile device of a user. In various embodiments, block 406 also can include calculating an optimal building entrance and recommending an optimal building entrance. In some embodiments when block 407 is performed (and/or when block 406 is performed to include calculating the optimal building entrance and recommending the optimal building entrance), a system and/or method can comprise block 417 for presenting an optimal entrance to a building to a user. In some embodiments, an optimal building entrance can be presented to a user on a GUI on a software application on a mobile device of a user. In other embodiments, a list of optimal building entrances can be presented to a user on a GUI on a software application on a mobile device of a user, and the user can choose a building entrance from one or more building entrances from which to begin an optimized route. In many embodiments, block 417 can further comprise presenting an optimized building exit to a user. In some embodiments, an optimal building exit can be presented to a user on a GUI on a software application on a mobile device of a user. In other embodiments, a list of optimal building exits can be presented to a user on a GUI on a software application on a mobile device of a user, and the user can choose a building exit from one or more building exits from which to end an optimized route. In some embodiments, an optimized building exit can comprise a checkout location.

In some embodiments, a system and/or method can comprise block 408 for receiving first data obtained from a barcode scanner. In some embodiments, data collected using a bar code scanner can be a distinct record, a set of records, a CAD file, a set of CAD files, or information describing a transaction. In some embodiments, information describing a transaction can comprise completing a transaction over a network 304 (FIG. 3) such as, for example, over the internet. In some embodiments, receiving data collected using a barcode scanner can incorporate the system and/or method disclosed in U.S. Pat. Nos. 9,818,091; 9,607,486, and U.S. Patent App. No. 2014/0214596, which are all herein incorporated by reference in their entirety. In some embodiments, block 408 includes receiving data obtained from an LBS module, and/or first data obtained from the barcode scanner in block 408 is replaced with data obtained from the LBS module.

In various embodiments of method 400, blocks 402, 404, and 406 can be performed before performing block 408 and without performing blocks 403, 405, and 407, and in various other embodiments of method 400, blocks 403, 405, and 407 can be performed before performing block 408 and without performing blocks 402, 404, and 406. In further embodiments, all of blocks 402-407 are performed before performing block 408, and in still further embodiments, method 400 continues from block 401 to 408 without performing any of blocks 402-407.

In some embodiments, a system and/or method can incorporate block 409 for querying a physical item database. As shown above in FIG. 3, in some embodiments, a physical item database can be a database such as database 301, 312 (FIG. 3). In some embodiments, a physical item database can comprise a set of records 302, 312 (FIG. 3) or one or more distinct records 303, 313, 314, 315, 316, 317 (FIG. 3). In some embodiments, a distinct record or a set of records can describe a location of a distinct physical item. In some embodiments, a set of records or a distinct record can describe a location of a set of physical items or a distinct physical item, respectively. A set of records or a distinct record can describe a location of a set of physical items or a distinct physical item, respectively, when they contain information about or describing a location of distinct physical item(s). In some embodiments, a set of records or distinct record can comprise a computer aided design/drafting (CAD) file or files. CAD files can be produced on any number of commercial aided design software such as, for example, AutoCAD® software or AllyCAD® software. In some embodiments, a location of a set of physical items or a distinct physical item can comprise information collected by an LBS module or a barcode scanner. In some embodiments, a location of a distinct item can be described using an aisle number and a section number. In some embodiments, an aisle number can describe an aisle such as, for example, an aisle in a library or a retail building. In some embodiments, an aisle comprises a shelf within the aisle. In some embodiments, a section number can describe a portion of a shelf or a portion of an aisle. In some embodiments, a section number describes a rectangular section on a face of a shelf ranging from approximately 5-foot by 5-foot to approximately 1-foot by 1-foot.

In some embodiments, a system and/or method can comprise block 410 for calculating an optimized route. Calculating an optimized route can be accomplished by using any optimization equations, algorithms, and/or heuristics known in the art. Exemplary equations, algorithms, and/or heuristics solve the Travelling Salesman Problem (e.g., given a list of waypoints and distances between each pair of waypoints, what is a shortest possible route that visits each waypoint and returns to an entrance?) and/or the Vehicle Routing Problem (e.g., what is an optimal set of routes for a group of users to traverse in order to arrive at a given set of waypoints?). In some embodiments, an optimized route can comprise a route that allows a user to most efficiently acquire items on an ordered list, a route through which the user's route time is minimized, a route that allows a user to access specific items on a user's list fastest, a route that allows a user to avoid most obstacles and/or congestion/traffic, a route that allows a user to obtain most items on a list in the shortest time period, a route most frequently used by a by a user based on historical user data, a route last used by a user, and/or a route selected by a user. For example, if historical data of a user indicates that a user often shops for frozen grocery items after non-frozen grocery items, an optimized route can send the user to a frozen section of a grocery store after non-frozen sections of the grocery store. In some embodiments, an optimized route can be calculated using set of records 302, 312 (FIG. 3), one or more distinct record 313, 314, 315, 316, 317 (FIG. 3), a distinct record not in a user history, a set of records not in a user history, a portion of a set of records not in a user history, a portion of an optimized route, a portion of a set of records, data collected using an LBS module, data collected using a barcode scanner, a series of distinct physical items, and/or a portion of a series of distinct physical items. For example, an optimized route in block 410 can be calculated based on items in an ordered list in block 401 and data received in block 408, which can be used to determine a location of a mobile device of the user. A location of a mobile device of the user can be used to determine a starting point for an optimized route. For example, a location determined in block 403 and/or block 408 can be a starting point for an optimized route. In the same or different embodiments, an optimized route can end at a checkout and/or exit location.

In some embodiments, after block 410, a system and/or method can comprise block 411 for calculating a completion time. In some embodiments, a completion time can be calculated using an average walking speed of a human, an average walking speed of a user, data collected using an LBS module, data collected using a barcode scanner, historic data collected using an LBS module, historic data collected using a barcode scanner, a distance of an optimized route, a set of records 302, 312 (FIG. 3), one or more distinct records 303, 313, 314, 315, 316, 317 (FIG. 3), a distinct record not in a user history, a set of records not in a user history, a portion of a set of records not in a user history, a portion of an optimized route, and/or a portion of a set of records.

In some embodiments, also after block 410, a system and/or method can comprise block 412 for using a building layout data. In some embodiments, building layout data can comprise a physical description, one or more images, one or more addresses, one or more GPS coordinates, one or more values associated with a geographic coordinate system, one or more computer aided design (CAD) files, one or more databases 301, 311 (FIG. 3), one or more aisle numbers, and/or one or more section numbers.

In some embodiments, a system and/or method can comprise block 413 for creating a reordered list. In some embodiments, a reordered list can be created using an optimized route (such as the first optimized route calculated in block 410), a set of records 302, 312 (FIG. 3), one or more distinct records 303, 313, 314, 315, 316, 317 (FIG. 3) a portion of an optimized route, a portion of a set of records, a distinct record not in a user history, a set of records not in a user history, and/or a portion of a set of records not in a user history. In various embodiments, an order of a reordered list can be determined using items associated with waypoints in an optimized route as discussed in block 410. In other words, an order of a reordered list can be determined by an order of stops in an optimized route as described in block 410. Therefore, in some embodiments, an order of a reordered list can comprise an order that allows a user to most efficiently acquire items on the ordered list, an order that minimizes a travel time of a user, an order that allows a user to access specific items on a list of a user, an order that allows a user to avoid most obstacles and/or congestion/traffic, an order that allows a user to obtain most items on a list in the shortest time period, an order most frequently used by a user based on historical user data, an order last used by a user, and/or an order selected by a user. For example, if historical data of a user indicates that a user often shops for frozen grocery items before non-frozen grocery items, a reordered list can place frozen items store before non-frozen items.

In various embodiments of method 400, block 411 is performed before performing block 413 and without performing block 412, and in various other embodiments of method 400, block 412 is performed before performing block 413 and without performing block 411. In further embodiments, blocks 411 and 412 are performed before performing block 413, and in still further embodiments, block 413 is performed after block 410 without performing either of blocks 411 or 412. Variations of the embodiments described earlier in this paragraph can include performing block 412 before performing block 410, and using the building layout data in block 412 to calculate the first optimized route in block 410.

In some embodiments, a system and/or method can comprise block 414 for presenting a first optimized route to a user. In some embodiments, an optimized route can be presented to a user on a GUI on a software application on a mobile device of a user. In other embodiments, a list of optimized routes can be presented to a user on a GUI on a software application on a mobile device of a user, and the user can choose an optimized route to display on the GUI. In some embodiments, an optimized route can begin at a location of a physical item and travel through locations of a series of distinct physical items. In some embodiments, a series of physical items can comprise one or more distinct physical items. In some embodiments, a series of physical items comprises a portion of a set of records and/or a portion of a set of physical items. A portion of a set of records can comprise at least one distinct record of the set of records. A portion of a set of distinct physical items can comprise at least one distinct records of the set of distinct physical items.

Figure 8:
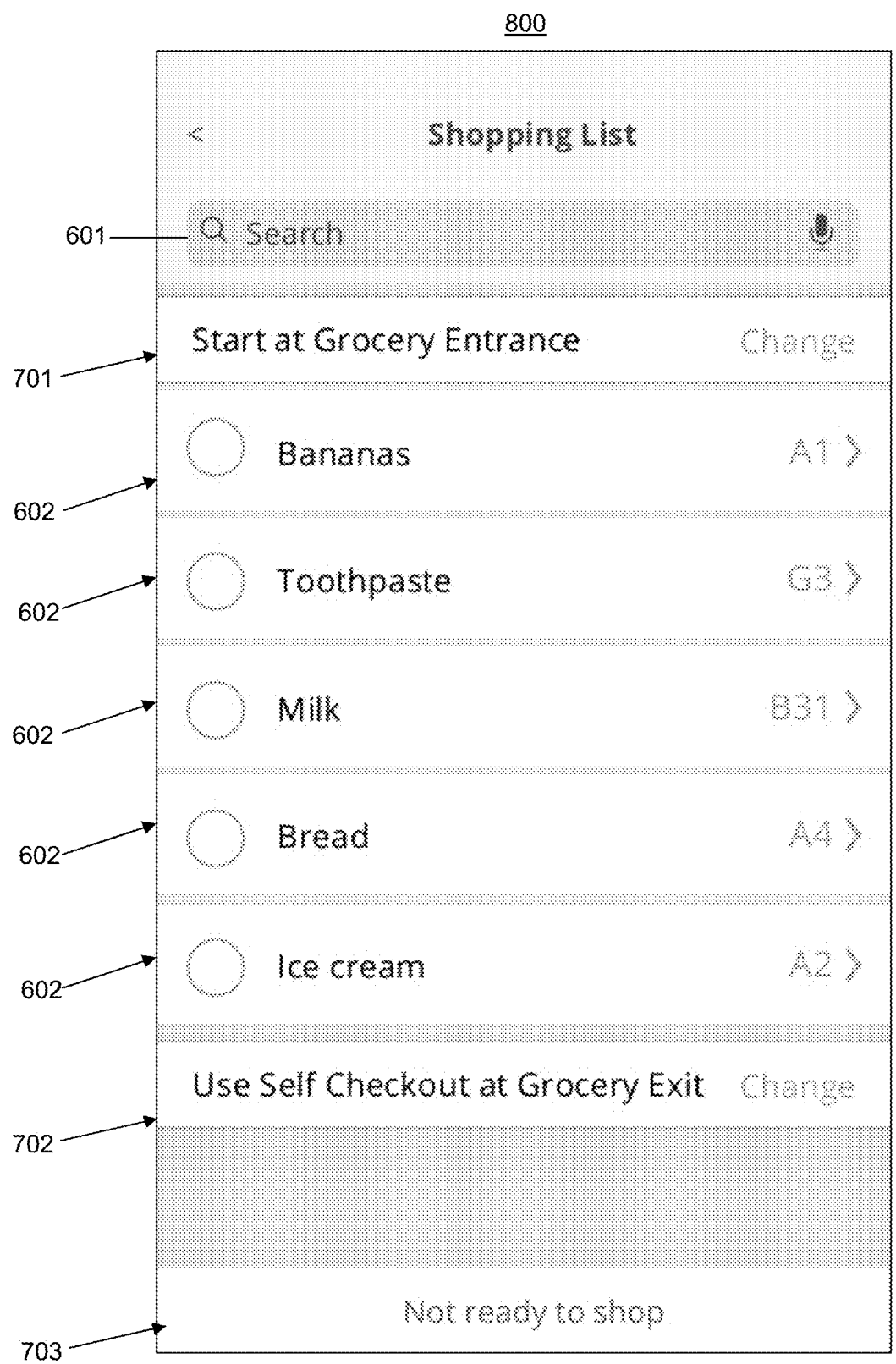

Continuing on in FIG. 4, in some embodiments, a system and/or method can comprise block 415 for presenting a first reordered list to a user. In some embodiments, a reordered list can be presented to a user on a GUI on a software application on a mobile device of a user. In other embodiments, a list of reordered lists can be presented to a user on a GUI on a software application on a mobile device of a user, and the user can choose a reordered list to display on the GUI. In some embodiments, a GUI displayed during block 415 can comprise a GUI 800 (FIG. 8).

In some embodiments, the system and/or method can comprise block 416 for presenting a first completion time to a user. In some embodiments, a completion time can be presented to a user on a GUI on a software application on a mobile device of a user. In other embodiments, a list of completion times can be presented to a user on a GUI on a software application on a mobile device of a user, and the user can choose a completion time to display on the GUI.

In various embodiments of method 400, only one of blocks 414-417 are performed after performing block 413, and in various other embodiments of method 400, two or three of blocks 414-417 are performed after performing block 413. In further embodiments, all of blocks 414-417 are performed after block 413.

Turning now to FIG. 5, a flowchart 500 of an exemplary embodiment of the disclosed system or method is shown. Flowchart 500 is merely exemplary and is not limited to the embodiments presented herein. Flowchart 500 can be employed in many different embodiments or examples not specifically depicted or described herein. In some embodiments, activities or blocks of flowchart 500 can be performed in an order presented. In other embodiments, activities of flowchart 500 can be performed in any suitable order. In still other embodiments, one or more of activities of flowchart 500 can be combined or skipped. In many embodiments, system 300 (FIG. 3) can be suitable to perform flowchart 500 and/or one or more of activities or blocks of flowchart 500. In these or other embodiments, one or more of activities or blocks of flowchart 500 can be implemented as one or more computer instructions configured to run at one or more processing modules and configured to be stored at one or more non-transitory memory storage modules. Such non-transitory memory storage modules can be part of a computer system, as described above. The processing module(s) can be similar or identical to the processing module(s) described above with respect to computer system 100 (FIG. 1) and computer system 200 (FIG. 2).

In some embodiments, flowchart 500 and other blocks in flowchart 500 can include using a distributed network including distributed memory architecture to perform the associated activity. This distributed architecture can reduce the impact on the network and system resources to reduce congestion in bottlenecks while still allowing data to be accessible from a central location.

In some embodiments, flowchart 500 can comprise flowchart 400 (FIG. 4). In many embodiments, a system and/or method of FIG. 5 can also comprise block 501 for receiving third data obtained from a barcode scanner and/or an LBS module. In some embodiments, third data can comprise one or more distinct records 303, 313, 314, 315, 316, 317 (FIG. 3) or a set of records 302, 312 (FIG. 3) that is not on an ordered list received from a user. In various embodiments, third data can comprise one or more distinct records 303, 313, 314, 315, 316, 317 (FIG. 3) or a set of records 302, 312 (FIG. 3) that is on an ordered list received from a user, but is not a next record on the ordered list received from the user.

In some embodiments, a system and/or method can comprise block 502 for querying a physical item database. In some embodiments, a physical item database can be a database such as database 301, 312 (FIG. 3). In some embodiments, a physical item database can comprise a set of records 302, 312 (FIG. 3) or one or more distinct records 314, 315 (FIG. 3). In some embodiments, a distinct record or a set of records can describe a location of a distinct physical item. In some embodiments, a set of records or a distinct record can describe a location of a set of physical items or a distinct physical item, respectively. A set of records or a distinct record can describe a location of a set of physical items or a distinct physical item, respectively, when they contain information about or describing a location of distinct physical item(s). In some embodiments, a set of records or distinct record can comprise a computer aided design/drafting (CAD) file or files. CAD files can be produced on any number of commercial aided design software such as, for example, AutoCAD® software or AllyCAD® software. In some embodiments, a location of a set of physical items or a distinct physical item can comprise information collected by an LBS module or a barcode scanner. In some embodiments, a location of a distinct item can be described using an aisle number and a section number. In some embodiments, an aisle number can describe an aisle such as, for example, an aisle in a library or a retail building. In some embodiments, an aisle comprises a shelf within the aisle. In various embodiments, a section number can describe a portion of a shelf or a portion of an aisle. In many embodiments, a section number describes a rectangular section on a face of a shelf ranging from approximately 5-foot by 5-foot to approximately 1-foot by 1-foot.

In some embodiments, the system and/or method can comprise block 503 for calculating a second optimized route. Calculating a second optimized route can be accomplished by using any optimization equations, algorithms, and/or heuristics known in the art. Exemplary equations, algorithms, and/or heuristics solve the Travelling Salesman Problem (e.g., given a list of waypoints and distances between each pair of waypoints, what is a shortest possible route that visits each waypoint and returns to an entrance?) and/or the Vehicle Routing Problem (e.g., what is an optimal set of routes for a group of users to traverse in order to arrive at a given set of waypoints?). In some embodiments, a second optimized route can comprise a route that allows a user to most efficiently acquire items on an ordered list (e.g., a first ordered list as described in block 401 (FIG. 4) and/or a second ordered list), a route through which the user's route time is minimized, a route that allows a user to access items on a user's list fastest, a route that allows a user to avoid most obstacles and/or congestion/traffic, a route that allows a user to obtain most items on a list in the shortest period of time, a route most frequently used by a by a user based on historical user data, a route last used by a user, and/or a route selected by a user. For example, if historical data of a user indicates that a user often shops for frozen grocery items before non-frozen grocery items, an optimized route can send the user to a frozen section of a grocery store before frozen sections of the grocery store. In many embodiments, a second optimized route can be configured to rejoin or converge with a first optimized route. In some embodiments, an optimized route can be calculated using a set of records 302, 312 (FIG. 3), one or more distinct records 303, 313, 314, 315, 316, 317 (FIG. 3), a distinct record not in a user history, a set of records not in a user history, a portion of a set of records not in a user history, a portion of an optimized route, an optimized route created in the past, a portion of an optimized route created at a past time, a portion of a set of records, data collected using an LBS module, data collected using a barcode scanner, a series of distinct physical items, and/or a portion of a series of distinct physical items. For example, a second optimized route in block 503 can be calculated based on the items or remaining items in an ordered list in block 401 (FIG. 4) and data received in block 501. In this embodiment, the data received in block 501 can be used to determine a location of a mobile device of a user. A location of a mobile device of a user can be used to determine a starting point for a second optimized route, which can be a modification or update of an optimized route of block 410 (FIG. 4). In various embodiments, a second optimized route can begin at a location as determined in block 502.

In some embodiments, after block 503, a system and/or method can comprise block 504 for calculating a second completion time. In some embodiments, a second completion time can be calculated using an average walking speed of a human, an average walking speed of a user, data collected using an LBS module, data collected using a barcode scanner, historic data collected using an LBS module, historic data collected using a barcode scanner, a distance of an optimized route, a set of records 302, 312 (FIG. 3), one or more distinct records 303, 313, 314, 315, 316, 317 (FIG. 3), a distinct record not in a user history, a set of records not in a user history, a portion of a set of records not in a user history, a portion of an optimized route, and/or a portion of a set of records. As an example, a second completion time can be a modification or update of the first completion time of block 411 (FIG. 4).

In some embodiments, also after block 503, a system and/or method can comprise block 505 for using building layout data. In some embodiments, building layout data can comprise a physical description, one or more images, one or more addresses, one or more GPS coordinates, one or more values associated with a geographic coordinate system, one or more computer aided design (CAD) files, one or more databases 301, 311 (FIG. 3), one or more aisle numbers, and/or one or more section numbers. In some embodiments, block 505 can be similar to block 411 (FIG. 4).

In some embodiments, a system and/or method can comprise block 506 for creating a second reordered list. In some embodiments, a second reordered list can be created using an optimized route, a set of records 302, 312 (FIG. 3), one or more distinct records 303, 313, 314, 315, 316, 317 (FIG. 3), a portion of an optimized route, a portion of a set of records, a distinct record not in a user history, a set of records not in a user history, a portion of a set of records not in a user history, a reordered list, a portion of a reordered list, a reordered list created at a past time, and/or a portion of a reordered list created at a past time. As an example, a second reordered list can be a modification or update of an ordered list of block 401 and/or a first reordered list of block 413 (FIG. 4).

In various embodiments of method 500, block 504 is performed before performing block 506 and without performing block 515, and in various other embodiments of method 500, block 505 is performed before performing block 506 and without performing block 504. In further embodiments, blocks 504 and 505 are performed before performing block 506, and in still further embodiments, block 506 is performed after block 503 without performing either of blocks 504 or 505. Variations of the embodiments described earlier in this paragraph can include performing block 505 before performing block 503, and using building layout data in block 505 to calculate a second optimized route in block 503.

In some embodiments, after block 506, a system and/or method can comprise block 507 for presenting a second optimized route to a user. In some embodiments, a second optimized route can be presented to a user on a GUI on a software application on a mobile device of a user. In other embodiments, a list of optimized routes can be presented to a user on a GUI on a software application on a mobile device of a user, and the user can choose an optimized route to display on the GUI.

In some embodiments, after block 506, a system and/or method can comprise block 508 for presenting a second reordered list to a user. In some embodiments, a second reordered list can be presented to a user on a GUI on a software application on a mobile device of a user. In other embodiments, a list of reordered lists can be presented to a user on a GUI on a software application on a mobile device of a user, and the user can choose a reordered list to display on the GUI. In some embodiments, a GUI displayed during block 508 can comprise GUI 800 (FIG. 8).

In some embodiments, after block 506, the system and/or method can comprise block 509 for presenting a second completion time to a user. In some embodiments, a second completion time can be presented to a user on a GUI on a software application on a mobile device of a user. In other embodiments, a list of completion times can be presented to a user on a GUI on a software application on a mobile device of a user, and the user can choose a completion time to display on the GUI. In various embodiments, a second completion time can be calculated similar to a first completion time as described in block 411 (FIG. 4).

In various embodiments of method 500, only one of blocks 507-509 are performed after performing block 506, and in various other embodiments of method 500, two of blocks 507-509 are performed after performing block 506. In further embodiments, all of blocks 507-509 are performed after block 506.

Figure 6:
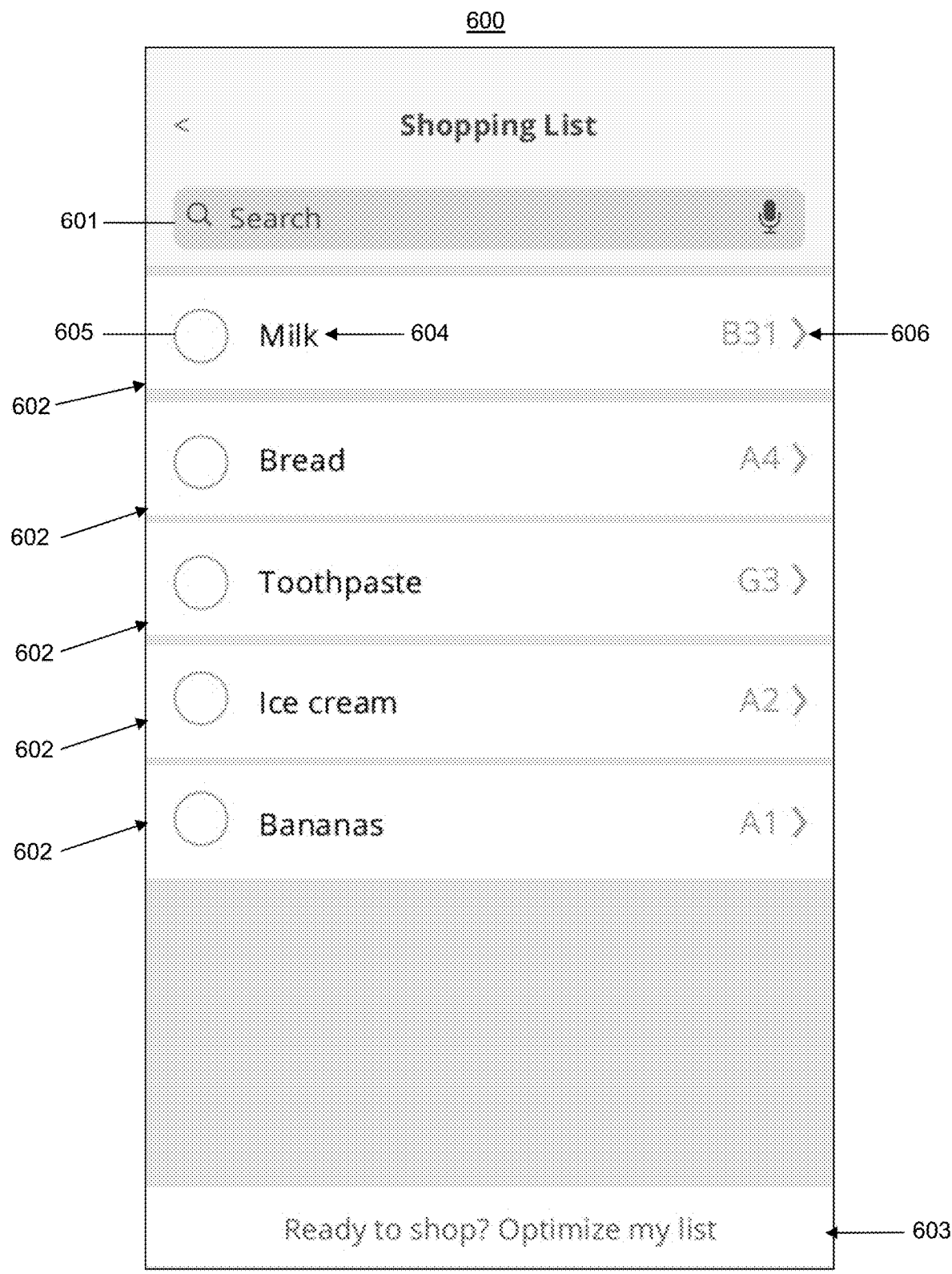
FIGS. 6-8 illustrate exemplary graphical user interfaces according to embodiments.
Figure 7:
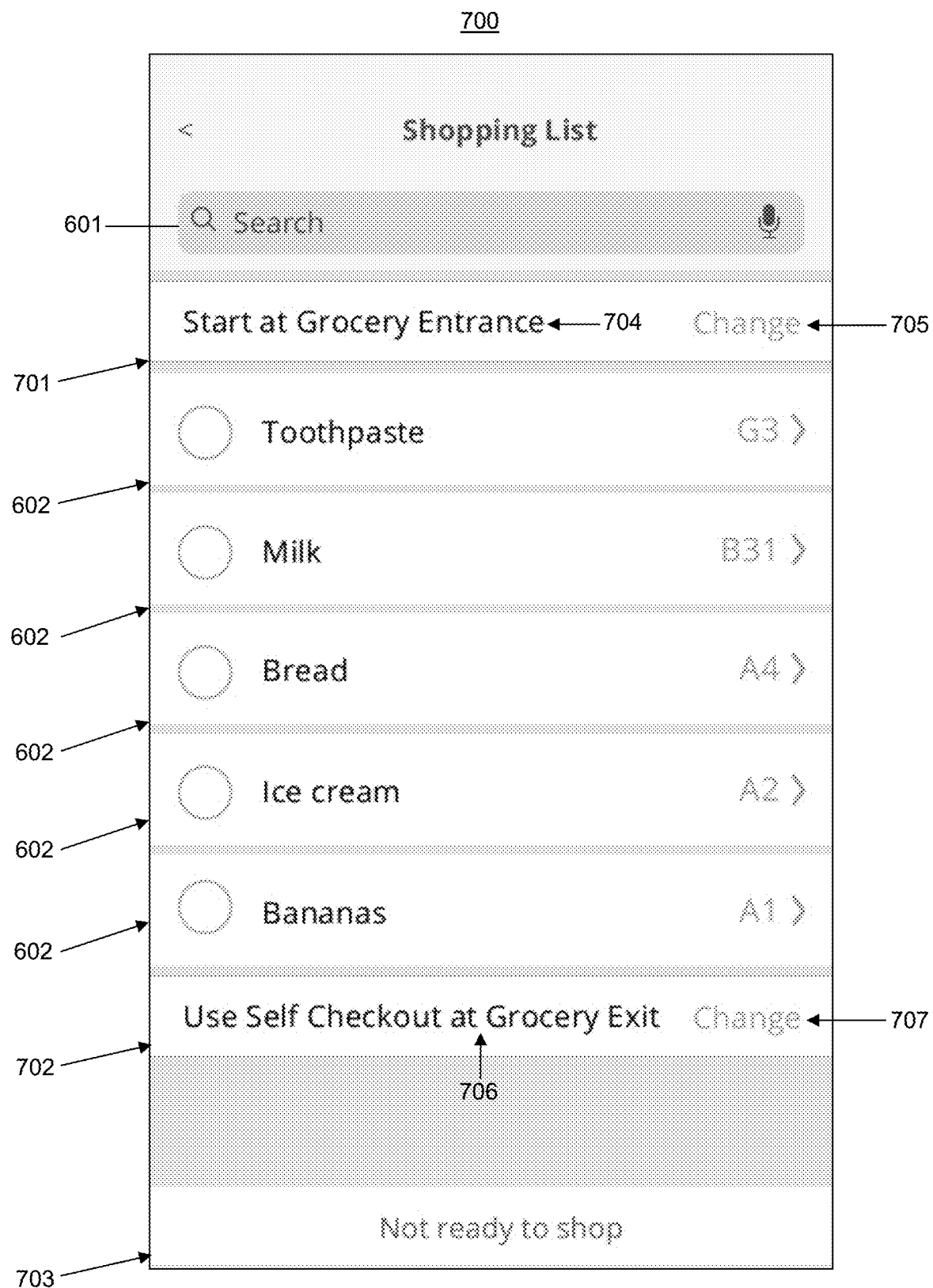

Turning now to FIG. 6, an exemplary embodiment of a GUI 600 is shown. In many embodiments, GUI 600 can display an ordered list as described in block 401, a first reordered list as described in block 413 (FIG. 4), and/or a second reordered list as described in block 506. In further embodiments, an ordered list can be optimized and used for navigation, as described in application Ser. No. 16/261,257, which is herein incorporated by this reference in it's entirety. In some embodiments, GUI 600 can comprise search box 601, a representation of a record 602, and/or an optimize button 603. In various embodiments, a search box 601 can comprise a text entry box that allows a user to enter a search query into search box 601. In the same or different embodiments, search box 601 can be configured to search a catalogue of distinct records describing physical items. In some embodiments, the catalogue of distinct records describing physical items can comprise a product catalogue of an eCommerce retailer and/or a list of items for sale in a grocery/supermarket. In many embodiments, search box 601 can be configured to search a list (e.g., an ordered list as described in block 401 (FIG. 4), a first reordered list as described in block 413 (FIG. 4), and/or a second reordered list as described in block 506) displayed in GUI 600. In some embodiments, a representation of a record 602 can comprise a record of an ordered list as described in block 401 (FIG. 4), a first reordered list as described in block 413 (FIG. 4), and/or a second reordered list as described in block 506 (FIG. 5). In various embodiments, an optimize button 603 can comprise a selectable user interface element. In the same or different embodiments, optimize button 603 can be configured to initiate optimization of a list displayed on GUI 600. In some embodiments, optimization of a list displayed on GUI 600 can comprise ordering or reordering a list as described in block 401 (FIG. 4), block 413 (FIG. 4), and/or block 506 (FIG. 5). In the same or different embodiments, In many embodiments, optimization of a list displayed on GUI 600 can comprise creating an optimized route as described in block 410 (FIG. 4) and/or block 503 (FIG. 5). In various embodiments, GUI 600 can be generated during block 414 (FIG. 4), block 415 (FIG. 4), block 417 (FIG. 4), block 415 (FIG. 4), block 508 (FIG. 5).

In many embodiments, a representation of a record 602 can comprise description 604, selectable element 605, and/or item location indicator 606. In some embodiments, description 604 can comprise text describing an item represented by representation of a record 602 and/or an image of an item represented by representation of a record 602. In many embodiments, selectable element 605 can be configured to be selected by a user. In various embodiments, after a user selects selectable element 605, an LBS module can locate the user at a location of an item represented by representation of a record 602. In the same or different embodiments, selection of selectable element 605 can cause the representation of a record 602 associated with the selectable element 605 to be removed from or greyed out on GUI 600. In some embodiments, item location indicator 606 can comprise a textual and/or image description of an item location. For example, a textual and/or image description can comprise a physical description of the item location, one or more images of the item location, one or more addresses of the item location, one or more GPS coordinates of the item location, one or more values associated with a geographic coordinate system of the item location, one or more computer aided design (CAD) files depicting the item location, one or more aisle numbers of the item location, and/or one or more section numbers of the item location. In many embodiments, item location indicator 606 can be configured to be selected by a user. In various embodiments, after a user selects item location indicator 606, an optimized route from a last location of a user to an image of an item represented by representation of a record 602 can be presented to a user.

In some embodiments, after a user selects item location indicator 606, block 414 (FIG. 4), block 416 (FIG. 4), block 417 (FIG. 4), block 507 (FIG. 5), and/or block 509 (FIG. 5) can be performed.

Turning now to FIG. 7, an exemplary embodiment of a GUI 700 is shown. In many embodiments, GUI 700 can display an ordered list as described in block 401, a first reordered list as described in block 413, and/or a second reordered list as described in block 506. In various embodiments, GUI 700 can be similar to GUI 600 (FIG. 6). In many embodiments, GUI 700 can be generated after optimize button 603 (FIG. 6) has been selected by a user. In the same or different embodiments, GUI 700 can comprise entrance indicator 701, exit indicator 702, and/or exit button 703. In many embodiments, entrance indicator 701 can comprise a selectable element that displays an optimized entrance to a building as described in block 410 (FIG. 4) and/or block 417 (FIG. 4). In the same or different embodiments, exit indicator 702 can comprise a selectable element that displays an optimized exit to a building as described in block 410 (FIG. 4) and/or block 417 (FIG. 4). In many embodiments, exit button 703 can comprise a selectable element configured to exit out of GUI 700. In some embodiments, when the selectable element of exit button 703 is selected by a user, GUI 700 can revert to GUI 600 and/or software 305, 308 can be closed and GUI 700 can revert to a mobile device operating system screen. In various embodiments, GUI 700 can be generated during block 414 (FIG. 4), block 415 (FIG. 4), block 417 (FIG. 4), block 415 (FIG. 4), block 508 (FIG. 5).

In many embodiments, entrance indicator 701 can further comprise entrance description 704 and/or entrance change button 705. In the same or different embodiments, entrance description 704 can comprise a textual and/or image description of an entrance location. For example, a textual and/or image description can comprise a physical description of the entrance location, one or more images of the entrance location, one or more addresses of the entrance location, one or more GPS coordinates of the entrance location, one or more values associated with a geographic coordinate system of the entrance location, one or more computer aided design (CAD) files depicting the entrance location, one or more aisle numbers of the entrance location, and/or one or more section numbers of the entrance location. In various embodiments, entrance change button 705 can comprise a selectable element configured to allow a user to customize and/or an optimized entrance. In some embodiments, after entrance change button 705 is selected by a user, block 401 (FIG. 4), block 406 (FIG. 4), block 407 (FIG. 4), block 410 (FIG. 4), block 411 (FIG. 4), block 413 (FIG. 4), block 503 (FIG. 5), block 504 (FIG. 5), and/or block 506 (FIG. 5) can be performed.

In many embodiments, exit indicator 702 can further comprise exit description 706 and/or exit change button 707. In the same or different embodiments, exit description 706 can comprise a textual and/or image description of an exit location. For example, a textual and/or image description can comprise a physical description of the exit location, one or more images of the exit location, one or more addresses of the exit location, one or more GPS coordinates of the exit location, one or more values associated with a geographic coordinate system of the exit location, one or more computer aided design (CAD) files depicting the exit location, one or more aisle numbers of the exit location, and/or one or more section numbers of the exit location. In various embodiments, exit change button 707 can comprise a selectable element configured to allow a user to customize and/or an optimized exit. In some embodiments, after exit change button 707 is selected by a user, block 401 (FIG. 4), block 406 (FIG. 4), block 407 (FIG. 4), block 410 (FIG. 4), block 411 (FIG. 4), block 413 (FIG. 4), block 503 (FIG. 5), block 504 (FIG. 5), and/or block 506 (FIG. 5) can be performed.

Turning now to FIG. 8, an exemplary embodiment of a GUI 800 is shown. In many embodiments, GUI 800 can display an ordered list as described in block 401, a first reordered list as described in block 413, and/or a second reordered list as described in block 506. In various embodiments, GUI 800 can be similar to GUI 600 (FIG. 6) and/or GUI 700 (FIG. 7). In many embodiments, GUI 700 can be generated after optimize button 603 (FIG. 6) has been selected by a user. In the same or different embodiments, GUI 800 can be generated after a list is optimized, a list is reordered, and/or a route is optimized. In many embodiments, GUI 800 can be generated after block 401 (FIG. 4), block 406 (FIG. 4), block 407 (FIG. 4), block 410 (FIG. 4), block 411 (FIG. 4), block 413 (FIG. 4), block 503 (FIG. 5), block 504 (FIG. 5), and/or block 506 (FIG. 5) are performed. In various embodiments, GUI 800 can be generated during block 414 (FIG. 4), block 415 (FIG. 4), block 417 (FIG. 4), block 415 (FIG. 4), block 508 (FIG. 5).

Figure 9:
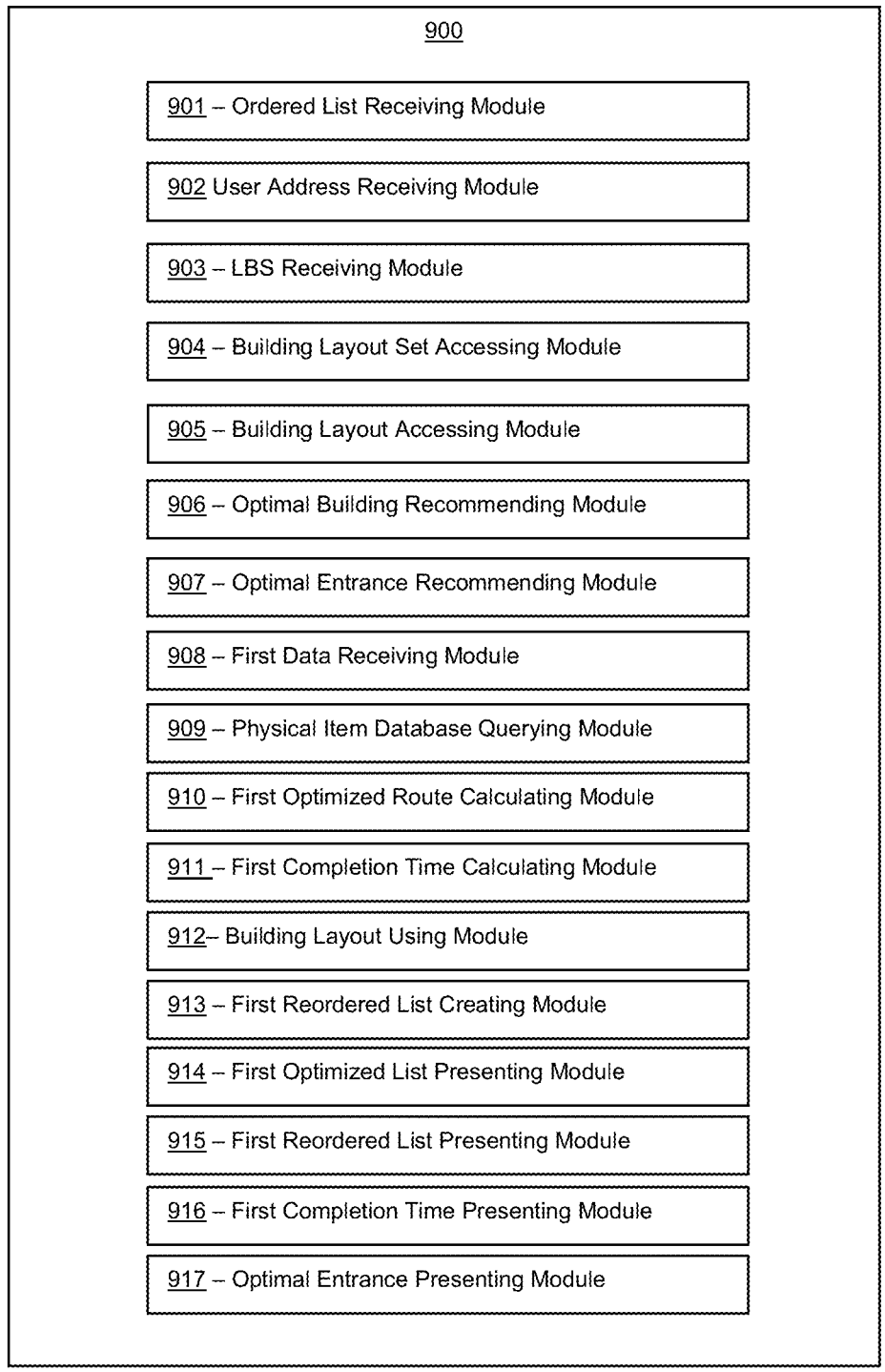
FIGS. 9-10 illustrate representative block diagrams of systems according to embodiments.

Turning now to FIG. 9, a block diagram of a system 900 that can be employed for navigation. System 900 is merely exemplary and embodiments of the system are not limited to the embodiments presented herein. System 900 can be employed in many different embodiments or examples not specifically depicted or described herein. In some embodiments, certain elements or modules of system 900 can perform various procedures, processes, and/or activities. In these or other embodiments, the procedures, processes, and/or activities can be performed by other suitable elements or modules of system 900.

Generally, therefore, system 900 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 900 described herein.

In many embodiments, system 900 can comprise non-transitory memory storage module 901. Memory storage module 901 can be referred to as ordered list receiving module 901. In many embodiments, ordered list receiving module 901 can store computing instructions configured to run on one or more processing modules and perform one or more acts of method 400 (FIG. 4) (e.g., activity 401 (FIG. 4)).

In many embodiments, system 900 can comprise non-transitory memory storage module 902. Memory storage module 902 can be referred to as user address receiving module 902. In many embodiments, user address receiving module 902 can store computing instructions configured to run on one or more processing modules and perform one or more acts of method 400 (FIG. 4) (e.g., activity 402 (FIG. 4)).

In many embodiments, system 900 can comprise non-transitory memory storage module 903. Memory storage module 903 can be referred to as LBS receiving module 903. In many embodiments, LBS receiving module 903 can store computing instructions configured to run on one or more processing modules and perform one or more acts of method 400 (FIG. 4) (e.g., activity 403 (FIG. 4)).

In many embodiments, system 900 can comprise non-transitory memory storage module 904. Memory storage module 904 can be referred to as building layout set accessing module 904. In many embodiments, building layout set accessing module 904 can store computing instructions configured to run on one or more processing modules and perform one or more acts of method 400 (FIG. 4) (e.g., activity 404 (FIG. 4)).

In many embodiments, system 900 can comprise non-transitory memory storage module 905. Memory storage module 905 can be referred to as building layout accessing module 905. In many embodiments, building layout accessing module 905 can store computing instructions configured to run on one or more processing modules and perform one or more acts of method 400 (FIG. 4) (e.g., activity 405 (FIG. 4)).

In many embodiments, system 900 can comprise non-transitory memory storage module 906. Memory storage module 906 can be referred to as optimal building recommending module 906. In many embodiments, optimal building recommending module 906 can store computing instructions configured to run on one or more processing modules and perform one or more acts of method 400 (FIG. 4) (e.g., activity 406 (FIG. 4)).

In many embodiments, system 900 can comprise non-transitory memory storage module 907. Memory storage module 907 can be referred to as optimal entrance recommending module 907. In many embodiments, optimal entrance recommending module 907 can store computing instructions configured to run on one or more processing modules and perform one or more acts of method 400 (FIG. 4) (e.g., activity 407 (FIG. 4)).

In many embodiments, system 900 can comprise non-transitory memory storage module 908. Memory storage module 908 can be referred to as first data receiving module 908. In many embodiments, first data receiving module 908 can store computing instructions configured to run on one or more processing modules and perform one or more acts of method 400 (FIG. 4) (e.g., activity 408 (FIG. 4)).

In many embodiments, system 900 can comprise non-transitory memory storage module 909. Memory storage module 909 can be referred to as physical item database querying module 909. In many embodiments, physical item database querying module 909 can store computing instructions configured to run on one or more processing modules and perform one or more acts of method 400 (FIG. 4) (e.g., activity 409 (FIG. 4)).

In many embodiments, system 900 can comprise non-transitory memory storage module 910. Memory storage module 910 can be referred to as first optimized route calculating module 910. In many embodiments, first optimized route calculating module 910 can store computing instructions configured to run on one or more processing modules and perform one or more acts of method 400 (FIG. 4) (e.g., activity 410 (FIG. 4)).

In many embodiments, system 900 can comprise non-transitory memory storage module 910. Memory storage module 911 can be referred to as first completion time calculating module 911. In many embodiments, first completion time calculating module 911 can store computing instructions configured to run on one or more processing modules and perform one or more acts of method 400 (FIG. 4) (e.g., activity 411 (FIG. 4)).

In many embodiments, system 900 can comprise non-transitory memory storage module 912. Memory storage module 912 can be referred to as building layout using module 912. In many embodiments, building layout using module 912 can store computing instructions configured to run on one or more processing modules and perform one or more acts of method 400 (FIG. 4) (e.g., activity 412 (FIG. 4)).

In many embodiments, system 900 can comprise non-transitory memory storage module 913. Memory storage module 913 can be referred to as additional information prompting module 913. In many embodiments, additional information prompting module 913 can store computing instructions configured to run on one or more processing modules and perform one or more acts of method 400 (FIG. 4) (e.g., activity 413 (FIG. 4)).

In many embodiments, system 900 can comprise non-transitory memory storage module 914. Memory storage module 914 can be referred to as first optimized list presenting module 914. In many embodiments, first optimized list presenting module 914 can store computing instructions configured to run on one or more processing modules and perform one or more acts of method 400 (FIG. 4) (e.g., activity 414 (FIG. 4)).

In many embodiments, system 900 can comprise non-transitory memory storage module 915. Memory storage module 915 can be referred to as first reordered list presenting module 915. In many embodiments, first reordered list presenting module 915 can store computing instructions configured to run on one or more processing modules and perform one or more acts of method 400 (FIG. 4) (e.g., activity 415 (FIG. 4)).

In many embodiments, system 900 can comprise non-transitory memory storage module 916. Memory storage module 916 can be referred to as first completion time presenting module 916. In many embodiments, first completion time presenting module 916 can store computing instructions configured to run on one or more processing modules and perform one or more acts of method 400 (FIG. 4) (e.g., activity 416 (FIG. 4)).

In many embodiments, system 900 can comprise non-transitory memory storage module 917. Memory storage module 917 can be referred to as optimal entrance presenting module 917. In many embodiments, optimal entrance presenting module 917 can store computing instructions configured to run on one or more processing modules and perform one or more acts of method 400 (FIG. 4) (e.g., activity 417 (FIG. 4)).

Figure 10:
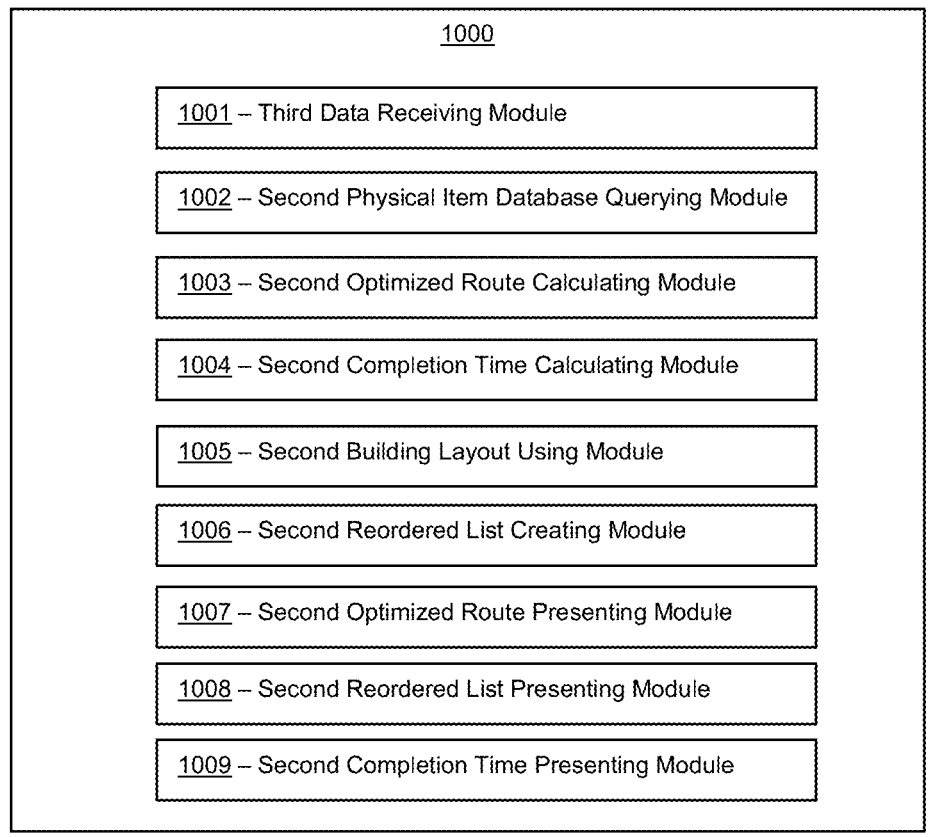

Turning now to FIG. 10, a block diagram of a system 1000 that can be employed for navigation. System 1000 is merely exemplary and embodiments of the system are not limited to the embodiments presented herein. System 1000 can be employed in many different embodiments or examples not specifically depicted or described herein. In some embodiments, certain elements or modules of system 900 can perform various procedures, processes, and/or activities. In these or other embodiments, the procedures, processes, and/or activities can be performed by other suitable elements or modules of system 1000.

In many embodiments, system 1000 can comprise non-transitory memory storage module 1001. Memory storage module 1001 can be referred to as third data receiving module 1001. In many embodiments, third data receiving module 1001 can store computing instructions configured to run on one or more processing modules and perform one or more acts of method 500 (FIG. 5) (e.g., activity 501 (FIG. 5)).

In many embodiments, system 1000 can comprise non-transitory memory storage module 1002. Memory storage module 1002 can be referred to as second physical item database querying module 1002. In many embodiments, second physical item database querying module 1002 can store computing instructions configured to run on one or more processing modules and perform one or more acts of method 500 (FIG. 5) (e.g., activity 502 (FIG. 5)).

In many embodiments, system 1000 can comprise non-transitory memory storage module 1003. Memory storage module 1003 can be referred to as second optimized route calculating module 1003. In many embodiments, second optimized route calculating module 1003 can store computing instructions configured to run on one or more processing modules and perform one or more acts of method 500 (FIG. 5) (e.g., activity 503 (FIG. 5)).

In many embodiments, system 1000 can comprise non-transitory memory storage module 1004. Memory storage module 1004 can be referred to as second completion time calculating module 1004. In many embodiments, second completion time calculating module 1004 can store computing instructions configured to run on one or more processing modules and perform one or more acts of method 500 (FIG. 5) (e.g., activity 504 (FIG. 5)).

In many embodiments, system 1000 can comprise non-transitory memory storage module 1005. Memory storage module 1005 can be referred to as second building layout using module 1005. In many embodiments, second building layout using module 1005 can store computing instructions configured to run on one or more processing modules and perform one or more acts of method 500 (FIG. 5) (e.g., activity 505 (FIG. 5)).

In many embodiments, system 1000 can comprise non-transitory memory storage module 1006. Memory storage module 1006 can be referred to as second reordered list creating module 1006. In many embodiments, second reordered list creating module 1006 can store computing instructions configured to run on one or more processing modules and perform one or more acts of method 500 (FIG. 5) (e.g., activity 506 (FIG. 5)).

In many embodiments, system 1000 can comprise non-transitory memory storage module 1007. Memory storage module 1007 can be referred to as second optimized route presenting module 1007. In many embodiments, second optimized route presenting module 1007 can store computing instructions configured to run on one or more processing modules and perform one or more acts of method 500 (FIG. 5) (e.g., activity 507 (FIG. 5)).

In many embodiments, system 1000 can comprise non-transitory memory storage module 1008. Memory storage module 1008 can be referred to as second reordered list presenting module 1008. In many embodiments, second reordered list presenting module 1008 can store computing instructions configured to run on one or more processing modules and perform one or more acts of method 500 (FIG. 5) (e.g., activity 508 (FIG. 5)).

In many embodiments, system 1000 can comprise non-transitory memory storage module 1009. Memory storage module 1009 can be referred to as second completion time presenting module 1009. In many embodiments, second completion time presenting module 1009 can store computing instructions configured to run on one or more processing modules and perform one or more acts of method 500 (FIG. 5) (e.g., activity 509 (FIG. 5)).

Although the above embodiments have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-10 may be modified, and that the foregoing discussion of certain of these embodiments does not necessarily represent a complete description of all possible embodiments. For example, one or more of the procedures, processes, or activities of FIGS. 1-10 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

We claim:
1. A system comprising:
one or more processors; and
one or more non-transitory memory storage devices storing computing instructions configured to run on the one or more processors and perform:
receiving an ordered list comprising a first set of records describing a first set of physical items;
receiving first data obtained from a barcode scanner, wherein the first data comprises a first distinct record describing a first distinct physical item within the first set of physical items;
querying a physical item database, wherein the physical item database comprises:
a second distinct record describing a location of the first distinct physical item; and
a second set of records describing locations of the first set of physical items;
calculating a first optimized route from the location of the first distinct physical item to a first series of distinct physical items using at least a portion of the second set of records and the second distinct record, wherein:
the first series of distinct physical items comprises at least a portion of the first set of physical items; and
the first optimized route comprises a shortest walking route from the location of the first distinct physical item to each respective distinct physical item of the first series of distinct physical items;
creating a first reordered list from the first series of distinct physical items using an order of each respective distinct physical item of the first series of distinct physical items in the first optimized route; and
presenting the first optimized route and the first reordered list to a user via a graphic user interface on a software application on a mobile device of the user.

2. The system of claim 1, wherein
receiving the ordered list from the user comprises:
- receiving user address data;
- accessing a set of building layout data wherein the set of building layout data comprises a set of records describing a physical layout of each building of a set of distinct buildings, wherein each building of the set of distinct buildings contains at least a portion of the first set of physical items; and
- recommending an optimal building from the set of distinct buildings using at least a portion of the first set of records, the user address data, and the building layout data.

3. The system of claim 1, wherein the ordered list is created using at least one of (1) a set of records selected by the user or (2) a past route traveled by the user.

4. The system of claim 1, wherein the computing instructions are further configured to perform:
- receiving fourth data gathered using the barcode scanner, wherein the fourth data comprises a fifth distinct record describing a third distinct physical item not in the first set of physical items;
- querying the physical item database wherein the physical item database further comprises a sixth distinct record describing a location of the third distinct physical item;
- calculating a third optimized route from the location of the third distinct physical item to a third series of distinct physical items using at least a portion of the second set of records and the sixth distinct record, wherein the third series of distinct physical items comprises at least a portion of the first set of physical items;
- creating a third reordered list from the third series of distinct physical items using the third optimized route; and
- presenting the third optimized route and the third reordered list to the user via the graphic user interface on the software application on the mobile device of the user.

5. The system of claim 1, wherein:
- the software application on the mobile device of the user further comprises at least one of a GPS module, a WiFi module, a NFC module, or a RFID module;
- receiving the ordered list from the user further comprises:
  - receiving second data obtained from the GPS module, the WiFi module, the NFC module, or the RFID module; and
  - accessing building layout data, wherein the building layout data describes a physical layout of a building;
- calculating the first optimized route further comprises using the building layout data and the second data to calculate the shortest walking route from the location of the first distinct physical item to each respective distinct physical item of the first series of distinct physical items; and
- presenting the first optimized route and the first reordered list to the user further comprises presenting the user with an optimal entrance to the building via the graphic user interface on the software application on the mobile device of the user.

6. The system of claim 5, wherein the building layout data comprises a computer aided design file.

7. The system of claim 1, wherein:
calculating the first optimized route further comprises
- calculating a first completion time for the first optimized route; and
- presenting the first optimized route and the first reordered list to the user further comprises presenting the first completion time to the user via the graphic user interface on the software application on the mobile device of the user.

8. The system of claim 7, wherein the computing instructions are further configured to perform:
- receiving third data obtained from the barcode scanner, wherein the third data comprises a third distinct record describing a second distinct physical item not in the first set of physical items;
- querying the physical item database, wherein the physical item database further comprises a fourth distinct record describing a location of the second distinct physical item;
- calculating a second optimized route from the location of the second distinct physical item to a second series of distinct physical items using at least a portion of the second set of records and the second distinct record, wherein the second series of distinct physical items comprises at least a portion of the first set of physical items;
- creating a second reordered list from the second series of distinct physical items using the second optimized route;
- calculating a second completion time for the second optimized route; and
- presenting the second optimized route, the second reordered list, and the second completion time to the user via the graphic user interface on the software application on the mobile device of the user.

9. The system of claim 1, wherein:
- the second distinct record comprises an aisle number describing an aisle, wherein the aisle comprises a shelf within the aisle and a section number describing a portion of the shelf; and
- the second set of records comprises a set of aisle numbers describing a set of aisles, wherein the set of aisles comprises a set of shelves and a set of section numbers describing portions of each of the set of shelves, and wherein the set of aisles comprises the aisle, the set of shelves comprise the shelf, the set of section numbers comprises the section number, and the portions of each of the set of shelves comprise the portion of the shelf.

10. The system of claim 9, wherein the first optimized route directs the user to a distinct aisle of the set of aisles and a distinct portion of the shelf of the portions of the set of shelves.

11. A method comprising:
- receiving an ordered list comprising a first set of records describing a first set of physical items;
- receiving first data obtained from a barcode scanner, wherein the first data comprises a first distinct record describing a first distinct physical item within the first set of physical items;
- querying a physical item database, wherein the physical item database comprises:
  - a second distinct record describing a location of the first distinct physical item; and
  - a second set of records describing locations of the first set of physical items;
- calculating a first optimized route from the location of the first distinct physical item to a first series of distinct physical items using at least a portion of the second set of records and the second distinct record, wherein:
  - the first series of distinct physical items comprises at least a portion of the first set of physical items; and the first optimized route comprises a shortest walking route from the location of the first distinct physical item to each respective distinct physical item of the first series of distinct physical items;

creating a first reordered list from the first series of distinct physical items using an order of each respective distinct physical item of the first series of distinct physical items in the first optimized route; and presenting the first optimized route and the first reordered list to a user via a graphic user interface on a software application on a mobile device of the user.

12. The method of claim 11, wherein receiving the ordered list from the user comprises:

receiving user address data;

accessing a set of building layout data wherein the set of building layout data comprises a set of records describing a physical layout of each building of a set of distinct buildings, wherein each building of the set of distinct buildings contains at least a portion of the first set of physical items; and recommending an optimal building from the set of distinct buildings using at least a portion of the first set of records, the user address data, and the building layout data.

13. The method of claim 11, wherein the ordered list is created using at least one of (1) a set of records selected by the user or (2) a past route traveled by the user.

14. The method of claim 11 further comprising:

receiving fourth data gathered using the barcode scanner, wherein the fourth data comprises a fifth distinct record describing a third distinct physical item not in the first set of physical items;

querying the physical item database wherein the physical item database further comprises a sixth distinct record describing a location of the third distinct physical item;

calculating a third optimized route from the location of the third distinct physical item to a third series of distinct physical items using at least a portion of the second set of records and the sixth distinct record, wherein the third series of distinct physical items comprises at least a portion of the first set of physical items;

creating a third reordered list from the third series of distinct physical items using the third optimized route; and presenting the third optimized route and the third reordered list to the user via the graphic user interface on the software application on the mobile device of the user.

15. The method of claim 11, wherein:

the software application on the mobile device of the user further comprises at least one of a GPS module, a WiFi module, a NFC module, or a RFID module;

receiving the ordered list from the user further comprises:

receiving second data obtained from the GPS module, the WiFi module, the NFC module, or the RFID module; and accessing building layout data, wherein the building layout data describes a physical layout of a building;

calculating the first optimized route further comprises using the building layout data and the second data to calculate the shortest walking route from the location of the first distinct physical item to each respective distinct physical item of the first series of distinct physical items; and presenting the first optimized route and the first reordered list to the user further comprises presenting the user with an optimal entrance to the building via the graphic user interface on the software application on the mobile device of the user.

16. The method of claim 15, wherein the building layout data comprises a computer aided design file.

17. The method of claim 11, wherein:

calculating the first optimized route further comprises calculating a first completion time for the first optimized route; and presenting the first optimized route and the first reordered list to the user further comprises presenting the first completion time to the user via the graphic user interface on the software application on the mobile device of the user.

18. The method of claim 17, further comprising:

receiving third data obtained from the barcode scanner, wherein the third data comprises a third distinct record describing a second distinct physical item not in the first set of physical items;

querying the physical item database, wherein the physical item database further comprises a fourth distinct record describing a location of the second distinct physical item;

calculating a second optimized route from the location of the second distinct physical item to a second series of distinct physical items using at least a portion of the second set of records and the second distinct record, wherein the second series of distinct physical items comprises at least a portion of the first set of physical items;

creating a second reordered list from the second series of distinct physical items using the second optimized route;

calculating a second completion time for the second optimized route; and presenting the second optimized route, the second reordered list, and the second completion time to the user via the graphic user interface on the software application on the mobile device of the user.

19. The method of claim 11, wherein:

the second distinct record comprises an aisle number describing an aisle, wherein the aisle comprises a shelf within the aisle and a section number describing a portion of the shelf; and the second set of records comprises a set of aisle numbers describing a set of aisles, wherein the set of aisles comprises a set of shelves and a set of section numbers describing portions of each of the set of shelves, and wherein the set of aisles comprises the aisle, the set of shelves comprise the shelf, the set of section numbers comprises the section number, and the portions of each of the set of shelves comprise the portion of the shelf.

20. The method of claim 19, wherein the first optimized route directs the user to a distinct aisle of the set of aisles and a distinct portion of the shelf of the portions of the set of shelves.

* * * * *